(12) United States Patent
Yamaura et al.

(10) Patent No.: US 7,994,776 B2
(45) Date of Patent: Aug. 9, 2011

(54) FAILURE DETECTION APPARATUS FOR RESOLVER

(75) Inventors: Tamotsu Yamaura, Atsugi (JP); Kenichi Hamada, Atsugi (JP); Yutaka Makino, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 255 days.

(21) Appl. No.: 12/369,141

(22) Filed: Feb. 11, 2009

(65) Prior Publication Data

US 2009/0206828 A1    Aug. 20, 2009

(30) Foreign Application Priority Data

Feb. 14, 2008    (JP) .................................. 2008-032660

(51) Int. Cl.
*G01B 7/30* (2006.01)
*G01R 35/00* (2006.01)
(52) U.S. Cl. .................................. 324/207.25; 324/202
(58) Field of Classification Search .................. 324/202, 324/207.25, 207.15, 207.16, 207.17
See application file for complete search history.

(56) References Cited

U.S. PATENT DOCUMENTS

| | | | |
|---|---|---|---|
| 7,009,535 B2 * | 3/2006 | Kanekawa et al. | 341/116 |
| 7,513,169 B2 * | 4/2009 | Noritou | 73/862.326 |
| 7,664,619 B2 * | 2/2010 | Kameya et al. | 702/183 |
| 2008/0052562 A1 * | 2/2008 | Kameya et al. | 714/47 |

FOREIGN PATENT DOCUMENTS

| | | | |
|---|---|---|---|
| JP | 9-072758 A | | 3/1997 |
| JP | 09280890 A | * | 10/1997 |
| JP | 02006177750 A | * | 7/2006 |

OTHER PUBLICATIONS

Machine English Translation, Igari et al. JP 09280890 A, p. 1-10, Oct. 1997.*
Machine English Translation, Miyata et al. JP02006177750A, p. 1-20, Jul. 2006.*

* cited by examiner

*Primary Examiner* — Ha Nguyen
*Assistant Examiner* — Alesa Allgood
(74) *Attorney, Agent, or Firm* — Foley & Lardner LLP

(57) ABSTRACT

A failure detection apparatus for a resolver outputting a sine signal indicative of sin θ and a cosine signal indicative of cos θ according to a rotational angle θ of a rotator, includes an inspection value calculating section configured to calculate an inspection value based on at least one of the sine signal and the cosine signal; a failure detecting section configured to judge whether the resolver is in a failure state or not on the basis of the inspection value; a counting section configured to gradually increase a count value with a lapse of time when the failure detecting section is determining that the resolver is in the failure state, and configured to gradually decrease the count value with a lapse of time when the failure detecting section is determining that the resolver is not in the failure state; and a failure deciding section configured to finally decide that the resolver has caused the failure on the basis of the count value.

7 Claims, 19 Drawing Sheets

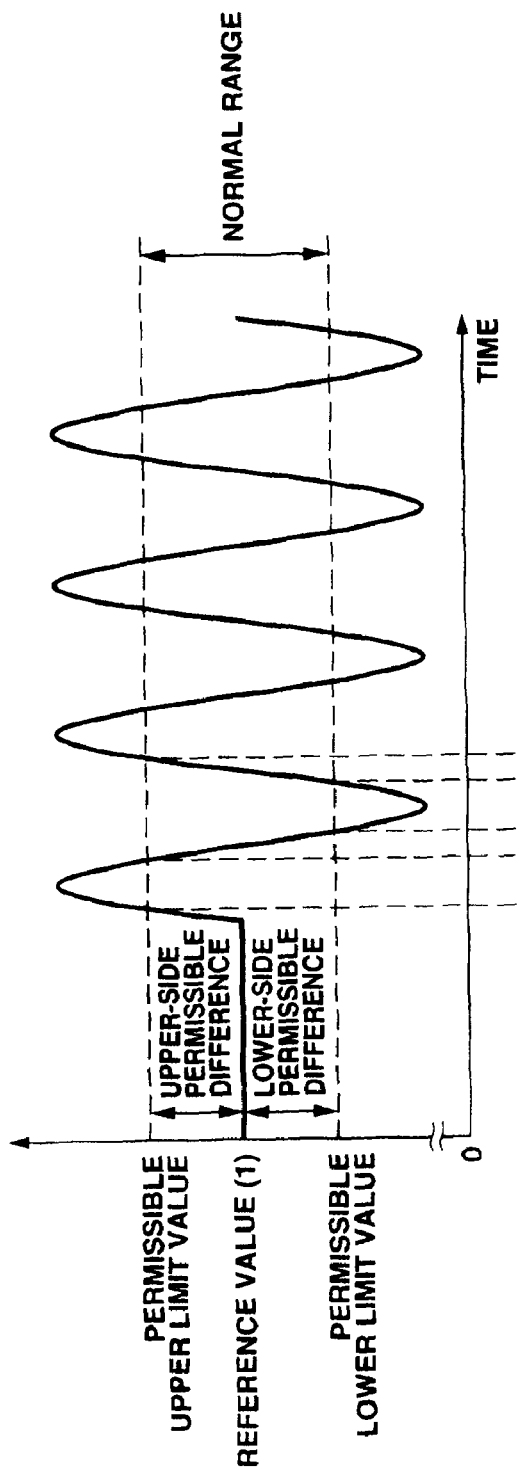
FIG.4A
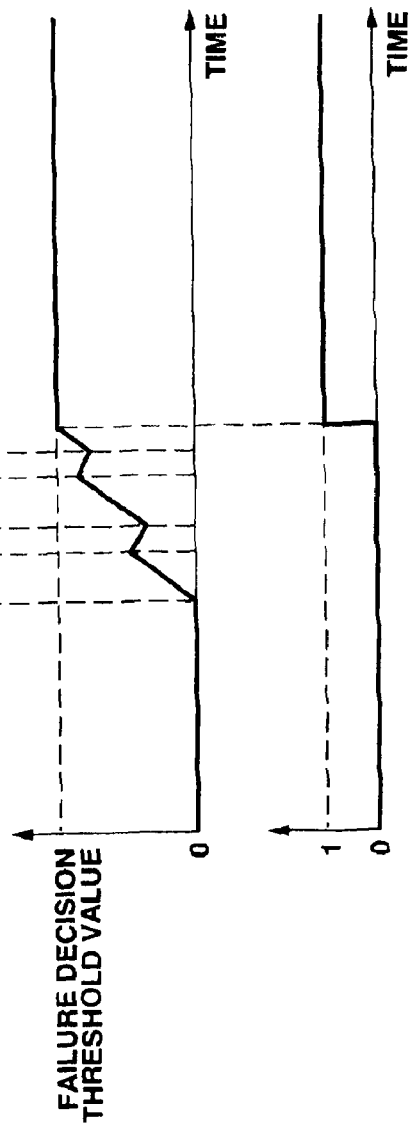
FIG.4B
FIG.4C

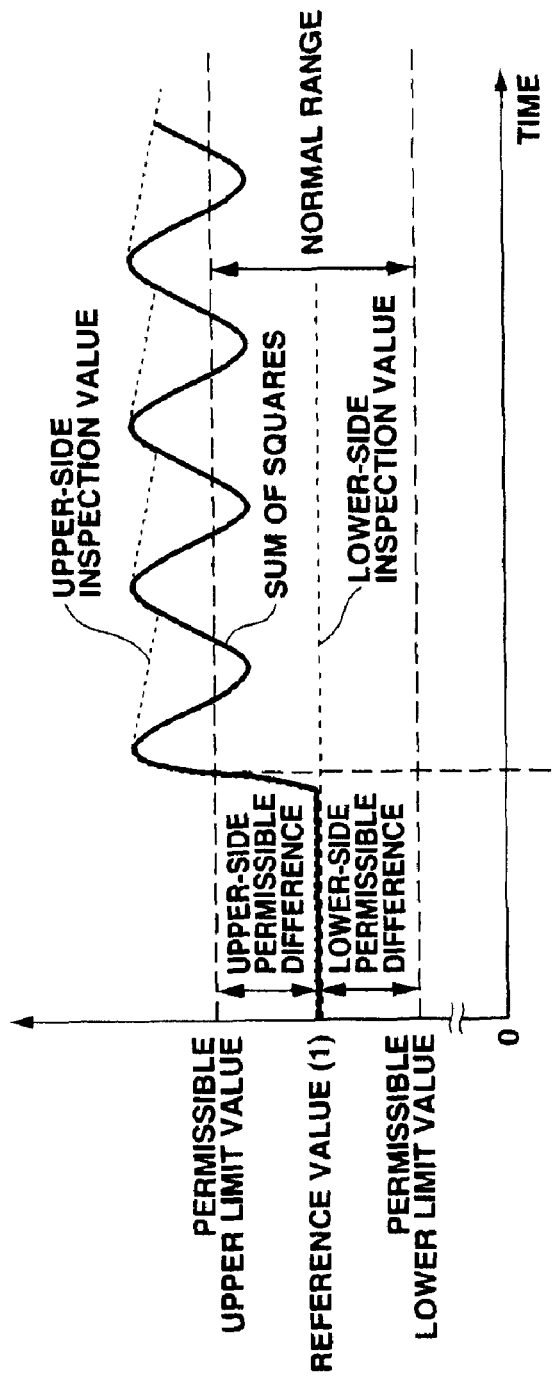
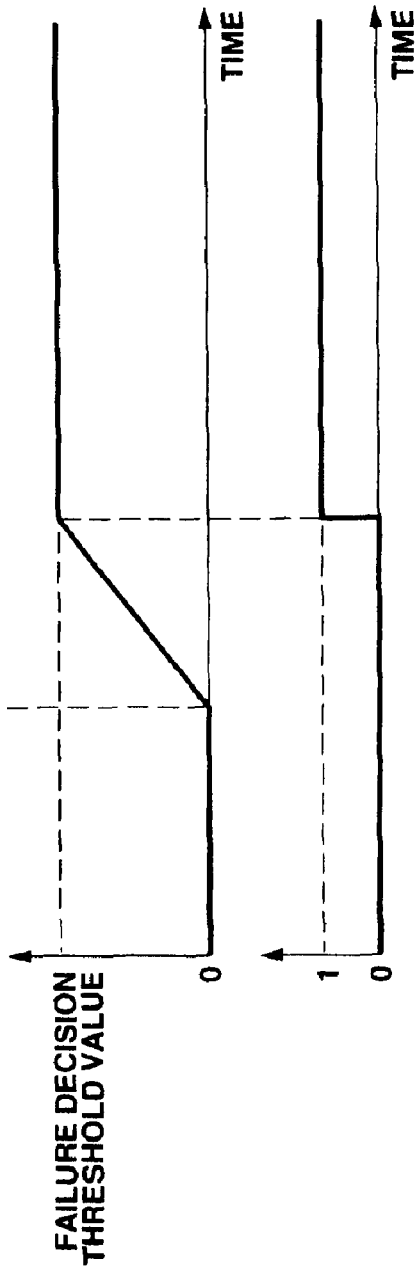
FIG.11A
FIG.11B
FIG.11C

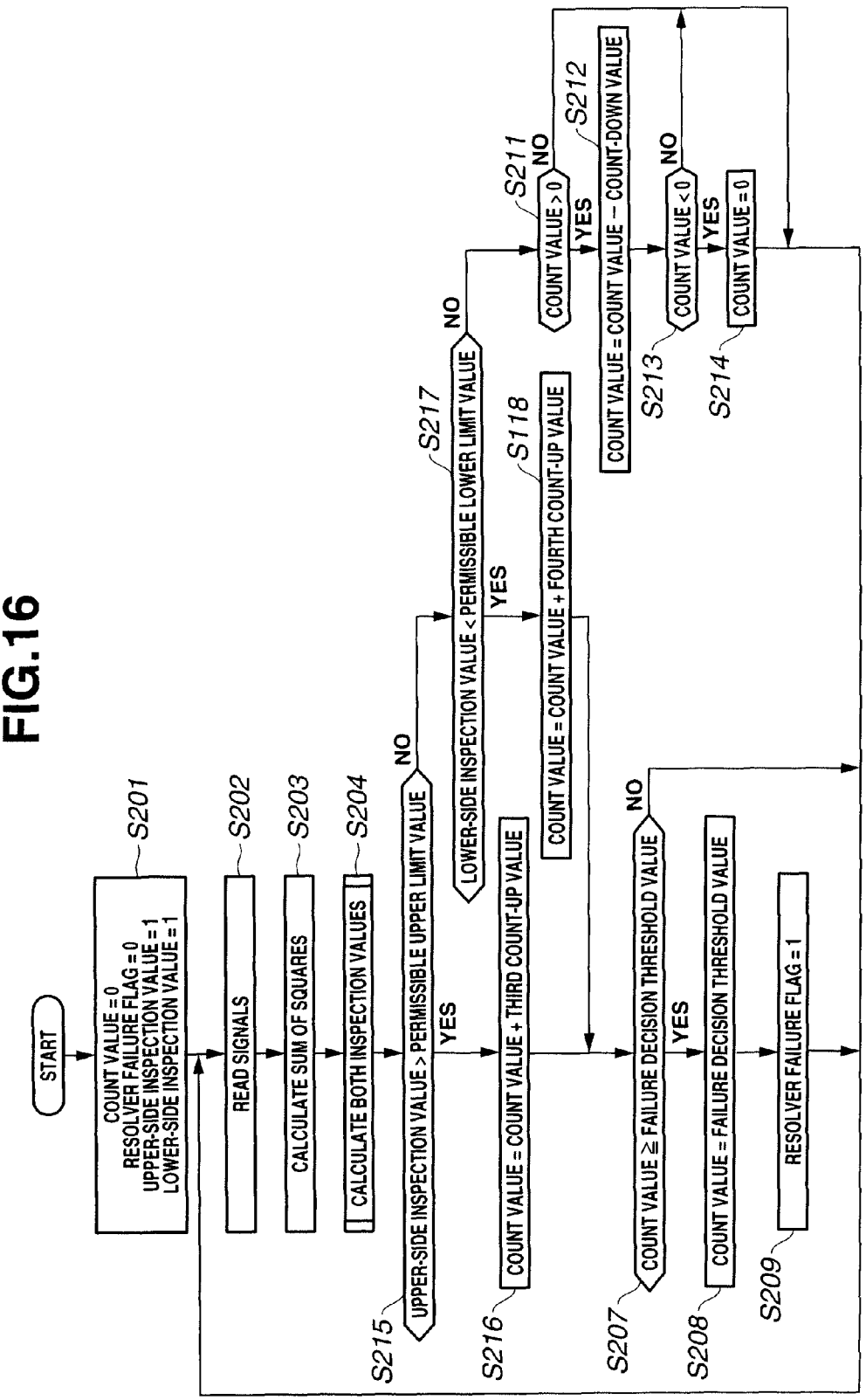

FAILURE DETECTION APPARATUS FOR RESOLVER

BACKGROUND OF THE INVENTION

The present invention relates to a failure (improper-state) detection apparatus for a resolver configured to output a sine signal indicative of sin θ and a cosine signal indicative of cos θ according to rotational angle θ of a rotator.

Japanese Patent Application Publication No. H09 (1997)-72758 discloses a previously-proposed failure detection apparatus for a resolver. In this technique, a value of $\sin^2 \theta + \cos^2 \theta$ is calculated based on the sine and cosine signals, and it is decided that the resolver has caused a failure when the value of $\sin^2 \theta + \cos^2 \theta$ deviates from a predetermined normal range.

SUMMARY OF THE INVENTION

However, when the resolver actually causes a failure, there is a case that the value of $\sin^2 \theta + \cos^2 \theta$ varies outwardly from the normal range and soon inwardly into the normal range and soon outwardly . . . according to the rotational angle θ of the rotator (i.e., repeats inward and outward variations across a boundary of the normal range and near the boundary). In this case, since the state where the value of $\sin^2 \theta + \cos^2 \theta$ is outside the normal range does not continue, there is a fear that the actual failure of the resolver cannot be detected. Moreover, when the resolver is in a normal state, there is a case that the value of $\sin^2 \theta + \cos^2 \theta$ temporarily deviates from the normal range due to an influence of noise or the like. In this case, there is a fear that the resolver actually operating in the normal state is regarded (decided) as in the failure state.

Therefore, it is an object of the present invention to provide a failure detection apparatus for a resolver, which is capable of accurately detecting (deciding) a failure of the resolver.

According to one aspect of the present invention, there is provided a failure detection apparatus for a resolver, the resolver being configured to output a sine signal indicative of sin θ and a cosine signal indicative of cos θ according to a rotational angle θ of a rotator, the failure detection apparatus comprising: an inspection value calculating section configured to calculate an inspection value based on at least one of the sine signal and the cosine signal; a failure detecting section configured to judge whether the resolver is in a failure state or not on the basis of the inspection value; a counting section configured to gradually increase a count value with a lapse of time when the failure detecting section is determining that the resolver is in the failure state, and configured to gradually decrease the count value with a lapse of time when the failure detecting section is determining that the resolver is not in the failure state; and a failure deciding section configured to finally decide that the resolver has caused the failure on the basis of the count value.

According to another aspect of the present invention, there is provided a failure detection apparatus for a resolver, the resolver being configured to output a sine signal indicative of sin θ and a cosine signal indicative of cos θ according to a rotational angle θ of a rotator, the failure detection apparatus comprising: a first inspection value calculating section configured to calculate a first inspection value based on at least one of the sine signal and the cosine signal; a second inspection value calculating section configured to calculate a second inspection value based on the first inspection value, to assign the first inspection value to the second inspection value if the first inspection value is greater than the second inspection value, and to decrease the second inspection value gradually with a lapse of time if the first inspection value is smaller than the second inspection value; a failure detecting section configured to judge whether the resolver is in a failure state or not on the basis of the second inspection value; a counting section configured to increase a count value when the failure detecting section is determining that the resolver is in the failure state, and configured to decrease the count value when the failure detecting section is determining that the resolver is not in the failure state; and a failure deciding section configured to decide that the resolver has caused the failure on the basis of the count value.

According to still another aspect of the present invention, there is provided a failure detection apparatus for a resolver, the resolver being configured to output a sine signal indicative of sin θ and a cosine signal indicative of cos θ according to a rotational angle θ of a rotator, the failure detection apparatus comprising: a first inspection value calculating section configured to calculate a first inspection value based on at least one of the sine signal and the cosine signal; a second inspection value calculating section configured to calculate a second inspection value and a third inspection value on the basis of the first inspection value, to assign the first inspection value to the second inspection value if the first inspection value is greater than the second inspection value, to decrease the second inspection value gradually with a lapse of time if the first inspection value is smaller than the second inspection value, to assign the first inspection value to the third inspection value if the first inspection value is smaller than the third inspection value, and to increase the third inspection value gradually with a lapse of time if the first inspection value is greater than the third inspection value; and a failure detecting section configured to judge whether the resolver is in a failure state or not on the basis of the second and third inspection values; a counting section configured to increase a count value when the failure detecting section is determining that the resolver is in the failure state, and configured to decrease the count value when the failure detecting section is determining that the resolver is not in the failure state; and a failure deciding section configured to decide that the resolver has caused the failure on the basis of the count value.

The other objects and features of this invention will become understood from the following description with reference to the accompanying drawings.

BRIEF DESCRIPTION OF THE DRAWINGS

FIGS. 4A to 4C are timing charts showing one example of operations of the resolver failure detecting section. FIG. 4A is a timing chart showing one example of variations of a sum value of squares. FIG. 4B is a timing chart showing a variation of a count value. FIG. 4C is a timing chart showing a variation of a resolver failure flag.

FIG. 8A is a timing chart showing one example of variations of the sum value of squares. FIG. 8B is a timing chart showing a variation of the count value. FIG. 8C is a timing chart showing a variation of the resolver failure flag.

FIGS. 11A to 11C are timing charts showing one example of operations of the resolver failure detecting section in the second embodiment. FIG. 11A is a timing chart showing one example of variations of the sum value of squares, variations of an upper-side inspection value, and variations of a lower-side inspection value. FIG. 11B is a timing chart showing a variation of the count value. FIG. 11C is a timing chart showing a variation of the resolver failure flag.

FIG. 15A is a timing chart showing one example of variations of the sum value of squares, variations of the upper-side inspection value, and variations of the lower-side inspection value. FIG. 15B is a timing chart showing a variation of the count value. FIG. 15C is a timing chart showing a variation of the resolver failure flag.

FIG. 16 is a flowchart showing processing contents of the resolver failure detecting section in a modified example of the third embodiment.

DETAILED DESCRIPTION OF THE INVENTION

Reference will hereinafter be made to the drawings in order to facilitate a better understanding of the present invention.

Figure 1:
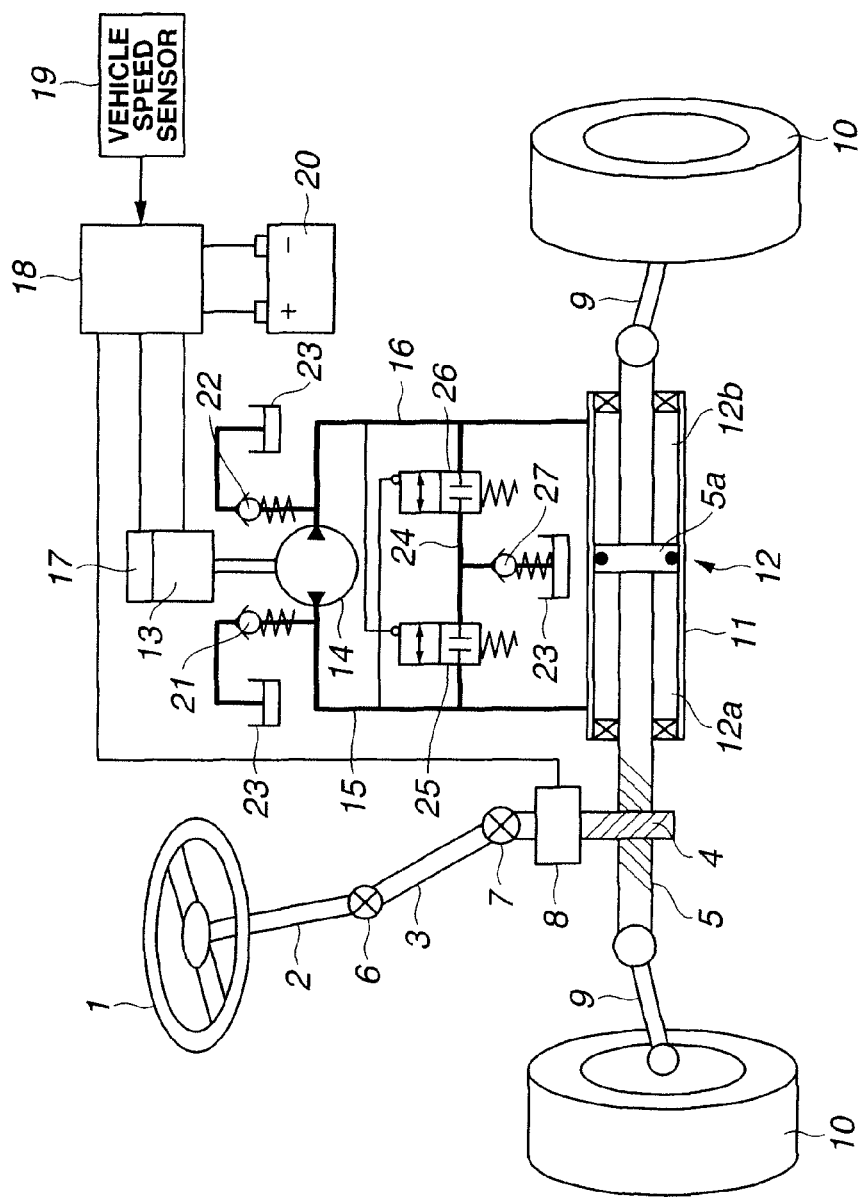
FIG. 1 is a system configuration view of a power steering apparatus in a first embodiment according to the present invention.

At first, a first embodiment according to the present invention is now explained in detail. FIG. 1 is a system configuration view of a power steering apparatus in the first embodiment.

As shown in FIG. 1, a steering wheel 1 which is rotationally manipulated by a driver is connected through a steering shaft 2 and an intermediate shaft 3 with a pinion shaft 4. The pinion shaft 4 is engaged or meshed with a rack shaft 5. That is, the pinion shaft 4 cooperates with the rack shaft 5 to define a so-called rack and pinion mechanism. The steering shaft 2 is connected through a universal joint 6 with the intermediate shaft 3, and the intermediate shaft 3 is connected through a universal joint 7 with the pinion shaft 4. On an intermediate portion of the pinion shaft 4, a commonly-known torque sensor 8 is provided as torque detecting means. A steering input torque which is a steering input from the steering wheel 1 is detected by the torque sensor 8.

Both end portions of the rack shaft 5 are respectively connected through tie rods 9 with (steering) road wheels 10. The rack shaft 5 moves in an axial direction of rack shaft 5 in accordance with a rotation of the steering wheel 1, and thereby the left and right road wheels 10 are respectively steered.

The rack shaft 5 passes through a cylinder tube 11, and a piston 5a is linked with an intermediate portion of the rack shaft 5. The rack shaft 5 and the cylinder tube 11 cooperate with the piston 5a to define a power cylinder 12 for a steering assist. That is, an internal space of the cylinder tube 11 is divided into a first oil-pressure (fluid pressure) chamber 12a and a second oil-pressure (fluid pressure) chamber 12b by the piston 5a.

In a fluid passage connecting the both pressure chambers 12a and 12b of the power cylinder 12 with each other, an oil pump 14 is provided. That is, the oil pump 14 is interposed between a fluid passage communicating with the pressure chamber 12a and a fluid passage connecting with the pressure chamber 12b. An electric motor 13 functioning as a rotator drives the oil pump 14 to enable the oil pump 14 to rotate in forward and reverse rotational directions. The oil pump 14 supplies working fluid (oil) to the both pressure chambers 12a and 12b of the power cylinder 12 or discharges working fluid from the both pressure chambers 12a and 12b of the power cylinder 12, and thereby the steering assist is performed. Concretely, the oil pump 14 includes a pair of suction-and-discharge ports. One suction-and-discharge port of the pair of suction-and-discharge ports is connected through a first oil passage 15 with the first pressure chamber 12a of power cylinder 12, and another suction-and-discharge port of the pair of suction-and-discharge ports is connected through a second oil passage 16 with the second pressure chamber 12b of power cylinder 12. The electric motor 13 is a so-called DC (direct-current) three-phase brushless motor, and is provided with a resolver 17 functioning as a motor rotational-position sensor.

The electric motor 13 is driven or controlled by a control unit 18 functioning as a drive control device. More specifically, the control unit 18 drives or controls the electric motor 13 by passing electric current from a battery 20 through the electric motor 13 in accordance with signals derived from the torque sensor 8, the resolver 17 and a vehicle speed sensor 19.

The first oil passage 15 is connected through a first check valve 21 with a reservoir tank 23, and the second oil passage 16 is connected through a second check valve 22 with the reservoir tank 23. The first check valve 21 permits working fluid to flow only in a direction from the reservoir tank 23 toward the first oil passage 15, and the second check valve 22 allows working fluid to flow only in a direction from the reservoir tank 23 toward the second oil passage 16. When working fluid inside the first and second oil passages 15 and 16 becomes insufficient, the first and second oil passages 15 and 16 are replenished with working fluid through the first and second check valves 21 and 22 from the reservoir tank 23.

Moreover, the first oil passage 15 is connected through a first changeover valve 25 with a drain oil passage 24 provided for draining a surplus working fluid into the reservoir tank 23. Similarly, the second oil passage 16 is connected through a second changeover valve 26 with the drain oil passage 24. Each of the first and second changeover valves 25 and 26 is a so-called pilot changeover valve of normally-closed type. The first changeover valve 25 operates by receiving the pressure within the second oil passage 16 as a pilot pressure of first changeover valve 25, and the second changeover valve 26 operates by receiving the pressure within the first oil passage 15 as a pilot pressure of second changeover valve 26.

A backpressure valve 27 is provided on the drain oil passage 24, and permits working fluid to flow only in a direction from drain oil passage 24 toward the reservoir tank 23. When a working-fluid pressure within the drain oil passage 24 exceeds a predetermined pressure (level), the backpressure valve 27 is opened so as to drain surplus working fluid into the reservoir tank 23.

Figure 2:
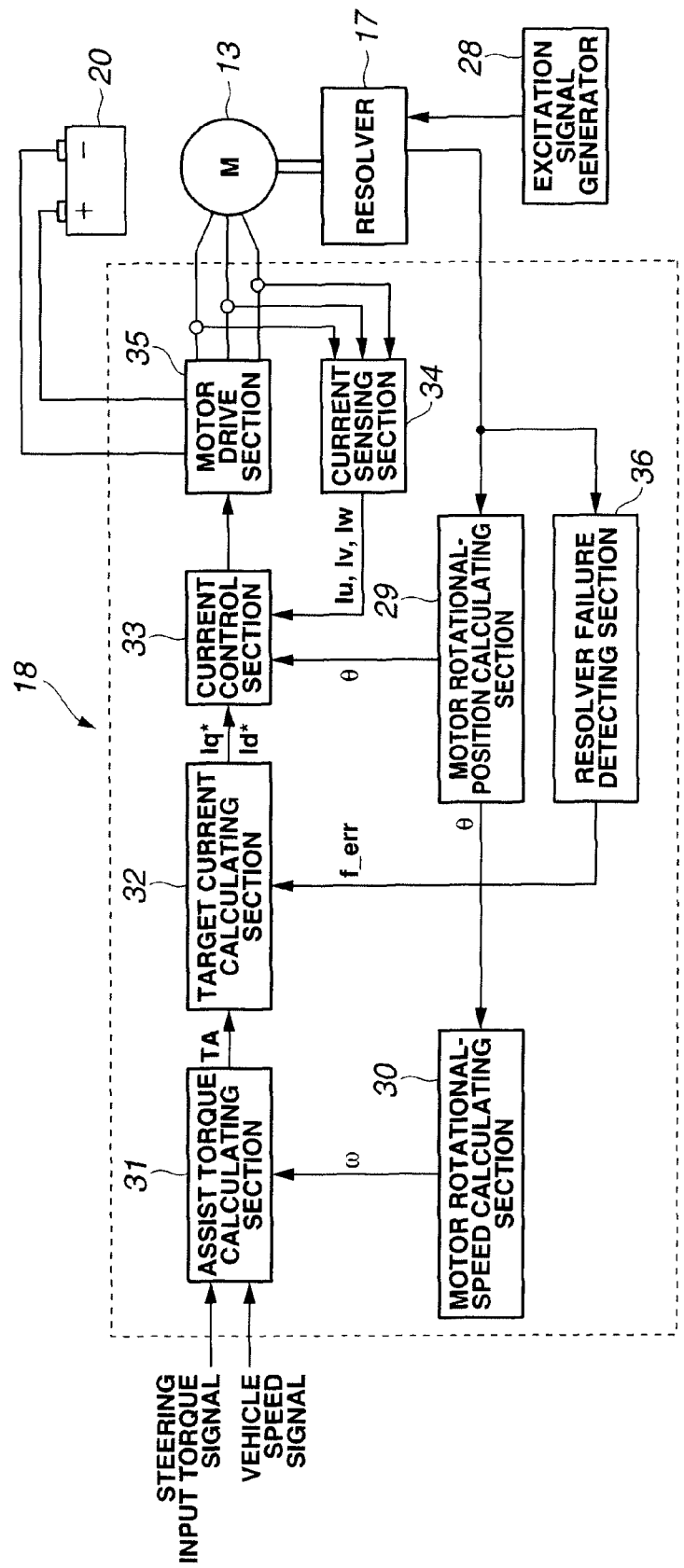
FIG. 2 is a block diagram showing a schematic configuration of a control unit shown in FIG. 1.

FIG. 2 is a block diagram showing a schematic configuration of the control unit 18. Concrete configurations of the control unit 18 will now be explained referring to FIG. 2.

The resolver 17 is configured to output a sine signal and a cosine signal to a motor rotational-position calculating section (or means) 29 and a resolver failure detecting section (or means) 36. The sine signal is obtained by modulating the amplitude of an excitation signal generated by an excitation signal generator (oscillator) 28, by means of $\sin \theta$ according to a rotational position $\theta$ of the electric motor 13. This excitation signal has a predetermined periodical waveform. The cosine signal is obtained by modulating the amplitude of this excitation signal by means of $\cos \theta$ according to the rotational position $\theta$ of the electric motor 13. That is, for example, in the case where the excitation signal is represented by $A \cdot \sin \omega t$ (A=amplitude, $\omega$=angular frequency, t=time); the sine signal becomes $K \cdot A \cdot \sin \omega t \cdot \sin \theta$, and the cosine signal becomes $K \cdot A \cdot \sin \omega t \cdot \cos \theta$ (K=voltage transformation ratio). In other words, the sine signal in output signals of the resolver 17 is indicative of (can mainly mean) $\sin \theta$, and the cosine signal in output signals of the resolver 17 is indicative of (can mainly mean) $\cos \theta$.

The motor rotational-position calculating section 29 calculates the motor rotational position $\theta$ of the electric motor 13 as a so-called electrical angle (degree), on the basis of the sine signal and the cosine signal derived from the resolver 17.

A motor rotational speed calculating section (or means) 30 calculates the motor rotational speed $\omega$ on the basis of a variation of the motor rotational position $\theta$ calculated by the motor rotational-position calculating section 29.

An assist torque calculating section (or means) 31 calculates an assist torque TA on the basis of the steering input torque signal derived from the torque sensor 8, the vehicle speed signal derived from the vehicle speed sensor 19, and the motor rotational speed $\omega$. This assist torque TA is a basis for a calculation of the following target electric current Iq*, Id*.

A target current calculating section (or means) 32 calculates the target electric currents Iq* and Id* of q-axis and d-axis which are necessary to drive the electric motor 13 according to the assist torque TA.

A current control section (or means) 33 transforms three-phase actual electric currents Iu, Iv and Iw sensed by a current sensing section (or means) 34, to two-phase values based on the motor rotational position $\theta$, i.e., performs three-phase to two-phase transformation. Thereby, the current control section 33 calculates actual electric currents Iq and Id for the q-axis and d-axis. The current control section 33 determines a PWM duty (signal) for driving the electric motor 13 by way of PID control based on a difference between the actual electric current Iq, Id and the target electric current Iq*, Id*.

A motor drive section (or means) 35 includes, for example, power components such as FETs. By carrying out a switching operation for the power components on the basis of the PWM duty determined by the current control section 33, the motor drive section 35 passes electric current corresponding to the target electric current Iq*, Id* from the battery 20 to the electric motor 13.

The resolver failure detecting section 36 detects a failure (i.e., improper state) of the resolver 17 on the basis of the sine and cosine signals derived from the resolver 17, and then outputs a resolver failure flag f_err to the target current calculating section 32. The resolver failure detecting section 36 sets the resolver failure flag f_err at 0 when determining that the resolver 17 is in a normal state (proper state). On the other hand, the resolver failure detecting section 36 sets the resolver failure flag f_err at 1 when determining that the resolver 17 is in an abnormal state (failure state). When the resolver failure flag f_err is at 1, the target current calculating section 32 sets each target electric current Iq*, Id* at 0 so that the drive of electric motor 13 is stopped.

Figure 3:
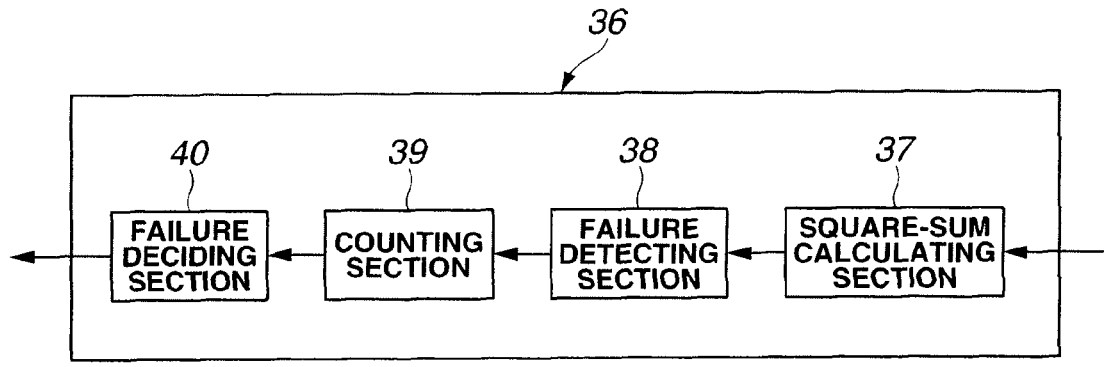
FIG. 3 is a block diagram showing details of a resolver failure detecting section shown in FIG. 2.

FIG. 3 is a block diagram showing details of the resolver failure detecting section 36. FIGS. 4A to 4C are timing charts showing one example of operations of the resolver failure detecting section 36 in the case where the resolver 17 becomes in failure state. Specifically, FIG. 4A is a timing chart showing one example of variations of an after-mentioned sum value of squares. FIG. 4B is a timing chart showing a variation of an after-mentioned count value in the case where the sum value of squares varies as shown in FIG. 4A. FIG. 4C is a timing chart showing a variation of the resolver failure flag f_err in the case where the count value varies as shown in FIG. 4B.

More specifically, the resolver failure detecting section 36 includes a square-sum calculating section 37 functioning as inspection value calculating means, a failure detecting section 38 functioning as failure detecting means, a counting section 39 functioning as counting means, and a failure deciding section 40 functioning as failure finally-determining means, as shown in FIG. 3.

The square-sum calculating section 37 calculates the sum value of squares which is a sum of a value given by squaring $\sin \theta$ (raising $\sin \theta$ to the second power) indicated by the sine signal and a value given by squaring $\cos \theta$ indicated by the cosine signal, as an inspection value as shown in FIG. 4A.

The failure detecting section 38 judges whether the resolver 17 is in failure state or not on the basis of the sum value of squares. Specifically, the failure detecting section 38 judges whether or not the sum value of squares is within a normal range defined between a predetermined permissible upper limit value (upper limit allowable tolerance) and a predetermined permissible lower limit value (lower limit allowable tolerance). When the sum value of squares becomes out of the normal range, the failure detecting section 38 determines that the resolver 17 is in the failure state.

The counting section 39 gradually increases the count value with a lapse of time, when the failure detecting section 38 is determining that the resolver 17 is in the failure state, as shown in FIG. 4B. That is, the count value becomes greater, as a time lapse becomes greater for which the failure detecting section 38 is determining the resolver 17 is in the failure state. On the other hand, the counting section 39 gradually decreases the count value with a lapse of time, when the failure detecting section 38 is determining that the resolver 17 is in the normal state (not in the failure state), as shown in FIG. 4B.

If the count value has become greater than or equal to a predetermined resolver-failure judging threshold value; the failure deciding section 40 decides (i.e., finally determines) that the resolver 17 has caused some failure (abnormal state), and then sets the resolver failure flag f_err at 1, as shown in FIG. 4C.

Figure 5:
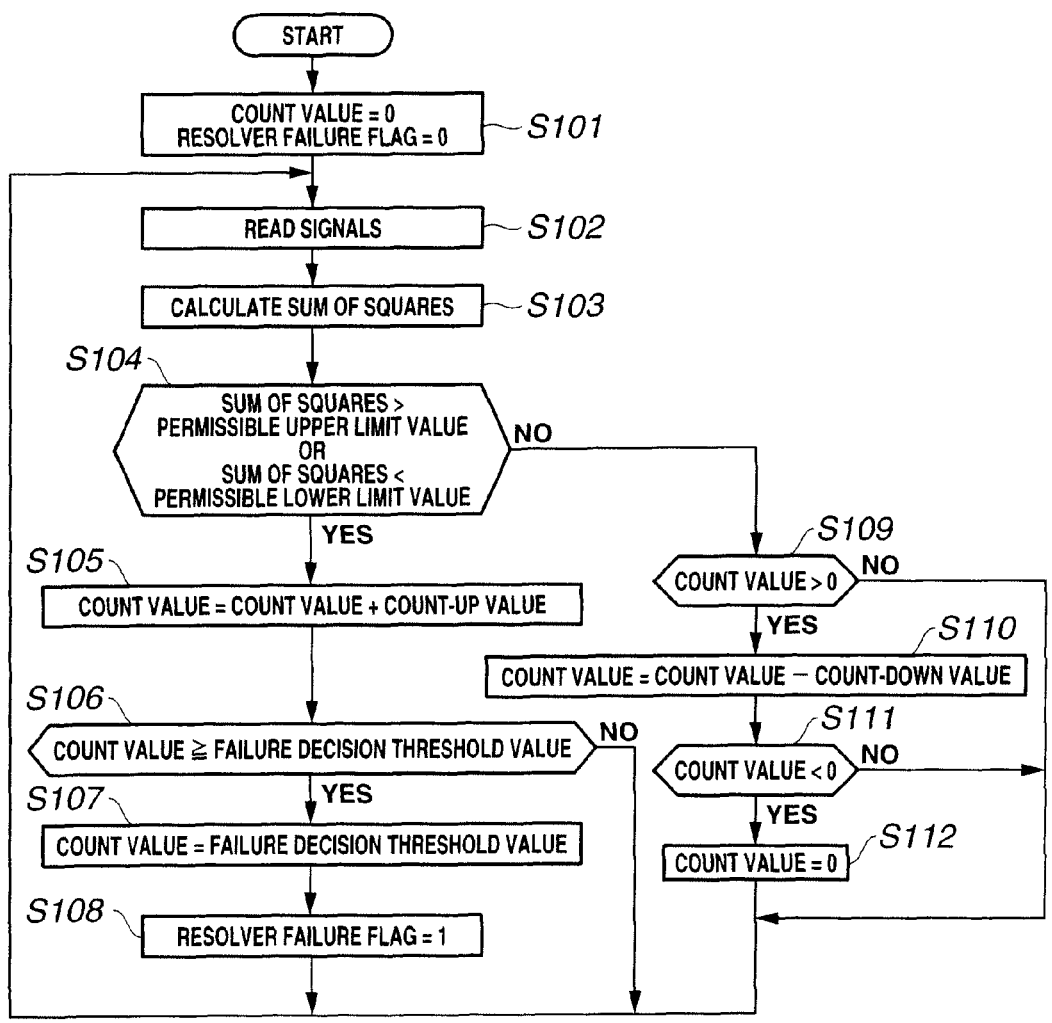
FIG. 5 is a flowchart showing processing contents in the resolver failure detecting section.

FIG. 5 is a flowchart showing processing contents in the resolver failure detecting section 36. Referring to FIG. 5, further concrete processing contents of the resolver failure detecting section 36 will now be explained below.

At first, the resolver failure detecting section 36 sets the count value at 0, and sets the resolver failure flag f_err at 0, as an initial setting, at step S001.

Then, the resolver failure detecting section 36 reads the sine signal and the cosine signal at step S102, and calculates the sum value of squares at step S103. Then, it is judged whether or not the sum value of squares is greater than the permissible upper limit value (sum of squares>permissible upper limit), and also it is judged whether or not the sum value of squares is smaller than the permissible lower limit value (sum of squares<permissible lower limit). Thereby, it is judged whether or not at least one of these two conditions (relational formulas: sum of squares>permissible upper limit, sum of squares<permissible lower limit) is satisfied, at step S104. In this embodiment, regarding the normal (permissible) range of the sum value of squares under the normal (not-failure) state of resolver 17, a reference value for this normal range is preset at 1 as shown in FIG. 4A. Namely, this reference value is defined as an ideal value for the sum of squares. An upper-side permissible difference (upper-side tolerance) given between this reference value and the permissible upper limit value is preset to be equal to a lower-side permissible difference (lower-side tolerance) given between this reference value and the permissible lower limit value, as shown in FIG. 4A.

If at least one of the above-mentioned two conditions (relational formulas) is satisfied at step S104, namely if the sum value of squares deviates from the normal range given between the permissible upper limit value and the permissible lower limit value; a predetermined value (count-up value) is added to the count value at step S105.

Then, it is judged whether or not the count value is greater than or equal to a failure decision threshold value (i.e., whether or not the formula: count value≧failure decision threshold value is satisfied) at step S106. If the count value is greater than or equal to the failure decision threshold value; the failure decision threshold value is substituted for the count value (count value←the failure decision threshold value) at step S107, and the resolver failure flag f_err is set at 1 at step S108. Then, the program proceeds back to step S102. If the condition (formula) of step S106 is not satisfied, the program proceeds directly back to step S102.

On the other hand, if at least one of the above-mentioned two conditions of step S104 is not satisfied (neither of both conditions is satisfied), namely if the sum value of squares is within the normal range given between the permissible upper limit value and the permissible lower limit value; it is judges whether or not the count value is greater than 0 at step S109. If the condition of step S109 is satisfied; a predetermined value (count-down value) is subtracted from the count value at step S110, and then the program proceeds to step S111. If the condition of step S109 is not satisfied, the program proceeds back to step S102.

At step S111, it is judged whether or not the count value is smaller than 0 (count value<0). If the count value is smaller than 0, the program proceeds to step S112. If the count value is not smaller than 0 at step S111, the program proceeds back to step S102.

At step S112, 0 is assigned to the count value (count value←0), and then program proceeds back to step S102.

In summary, when the sum value of squares has a deviation from the normal range given between the permissible upper limit value and the permissible lower limit value, the count value is gradually increased by adding the count-up value to the count value every a predetermined period. On the other hand, when the sum value of squares is within the normal range given between the permissible upper limit value and the permissible lower limit value, the count value is gradually decreased by subtracting the count-down value from the count value every predetermined period. That is, the count value is gradually increased for a time interval for which the sum value of squares is deviating from the normal range, and the count value is gradually decreased for a time interval for which the sum value of squares is within the normal range. In this embodiment, the count-up value is set at a value greater than the count-down value, in order to quickly detect some failure of resolver 17 when the resolver 17 causes the failure.

In the above-mentioned failure detection apparatus for resolver disclosed in Japanese Patent Application Publication No. H09 (1997)-72758, there are the following concerns. That is, in the case that the resolver has become in an actual failure state, and the above-mentioned detection value ($\sin^2 \theta + \cos^2 \theta$) varies outward from the normal range (tolerance) and also inward into the normal range (repeats inward and outward variations relative to the normal range) according to the rotational angle θ of the rotator; the state where this detection value is outside the normal range does not continue. Hence, in this case, the actual failure of the resolver might fail to be detected.

Therefore, in another technology, a failure detection apparatus is disclosed in which the count value is increased by accumulating or integrating the count value every time the above-mentioned detection value ($\sin^2 \theta + \cos^2 \theta$) deviates from the normal range, and the failure of resolver is decided (finally determined) when the accumulated count value becomes greater than or equal to a predetermined value.

However, in such a technique, there are the following concerns. That is, in the case that the resolver is actually in normal state (not-failed state), and the above-mentioned detection value temporarily deviates from the normal range due to an influence of noise or the like; the count value is accumulated and increased every time the detection value temporarily deviates from the normal range due to the noises. Thereby, the count value might exceed the above-mentioned predetermined value (failure decision threshold value), so that the resolver operating actually in normal state might be decided as in failure state.

On the contrary, in this embodiment according to the present invention, the count value is gradually increased while the sum value of squares is outside of the normal range. Accordingly, even in the case that the resolver 17 becomes in the actual failure state, and the sum value of squares varies outwardly from the normal range (tolerance) and also inwardly into the normal range repeatedly (near the boundary of the normal range); this failure of the resolver 7 can be reliably detected. Moreover, even in the case that the sum value of squares temporarily deviates from the normal range due to an influence of noise or the like, and thereby the count value increases; the count value is gradually decreased during intervals during which the sum value of squares is kept within the normal range. Therefore, the resolver 17 actually operating in the normal state can be prevented from being decided as the failure state. Accordingly, according to this embodiment, the failure (abnormality) of the resolver 17 can be detected accurately.

Hereinabove, the details of the first embodiment have been explained. Next, effects and advantages according to the first embodiment will be explained below.

In the first embodiment, the failure detection apparatus includes the inspection value calculating section 37 configured to calculate the inspection value based on at least one of the sine signal and the cosine signal; the failure detecting section 38 configured to judges whether or not the resolver is in the failure state on the basis of the inspection value; the counting section 39 configured to gradually increase the count value with a lapse of time when the failure detecting section 38 is determining that the resolver is in the failure state, and configured to gradually decrease the count value with a lapse of time when the failure detecting section 38 is determining that the resolver is not in the failure state; and the failure deciding section 40 configured to finally decide that the resolver has caused the failure (improper state) on the basis of the count value.

Therefore, according to the first embodiment, the count value is gradually increased when the failure detecting section 38 is determining that the resolver is in the failure state. Thereby, even in the case that the resolver actually has become in the failure state, and the failure detecting section 38 cannot recognize the failure of the resolver for a continuous long time; this actual failure of the resolver can be reliably detected, i.e., finally decided. Moreover, even in the case that the failure detecting section 38 temporarily determines that the resolver is in the failure state due to an influence of noise or the like, and thereby the count value increases; the count value is gradually decreased during an interval during which the failure detecting section 38 is determining that the resolver is not in the failure state. Therefore in this case, the resolver actually operating in the normal state can be prevented from being finally decided as the failure state. Accordingly, the failure (abnormality) of the resolver can be detected accurately.

More specifically, in the first embodiment, the inspection value is the sum of a value given by squaring sin θ indicated by the sine signal and a value given by squaring cos θ indicated by the cosine signal. Hence, when this inspection value is outside the normal range given between the permissible maximum value and the permissible minimum value, the failure detecting section 38 determines that the resolver is in the failure state. Thereby, when the count value becomes greater than or equal to the predetermined failure decision threshold value, the failure deciding section 40 finally decides that the resolver has caused the failure.

More specifically, in the first embodiment, the counting section 39 is configured to add the predetermined count-up value to the count value every predetermined period while the failure detecting section 38 is determining that the resolver is in the failure state, and configured to subtract the predetermined count-down value from the count value every predetermined period while the failure detecting section 38 is not determining that the resolver is in the failure state. Moreover, the predetermined count-up value is greater than the predetermined count-down value. Accordingly, when the resolver becomes in an actual failure state, this failure can be detected promptly.

Figure 6:
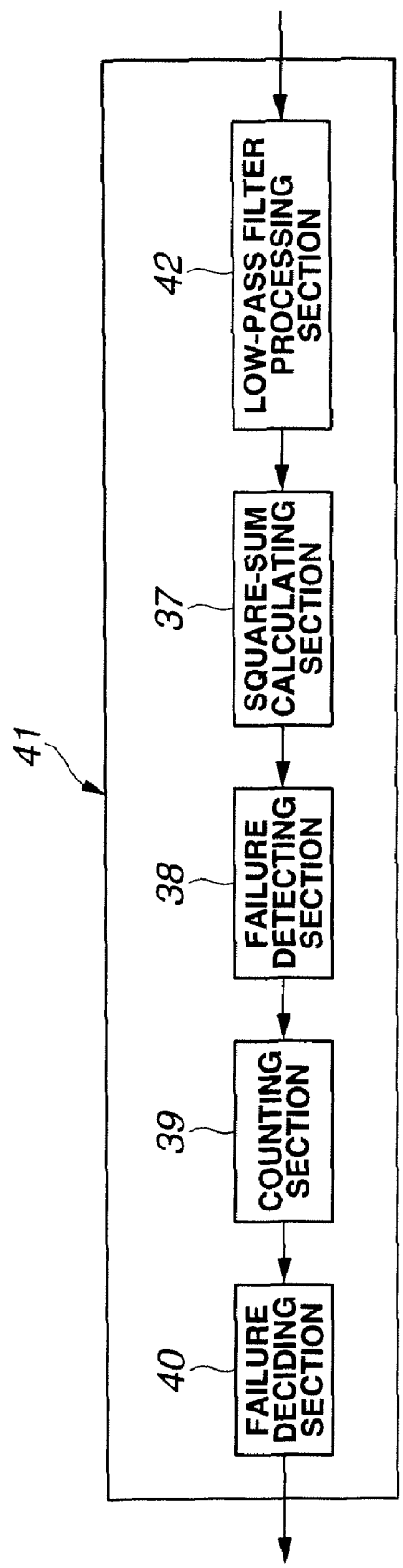
FIG. 6 is a block diagram showing details of a resolver failure detecting section in a first modified example of the first embodiment.
Figure 7:
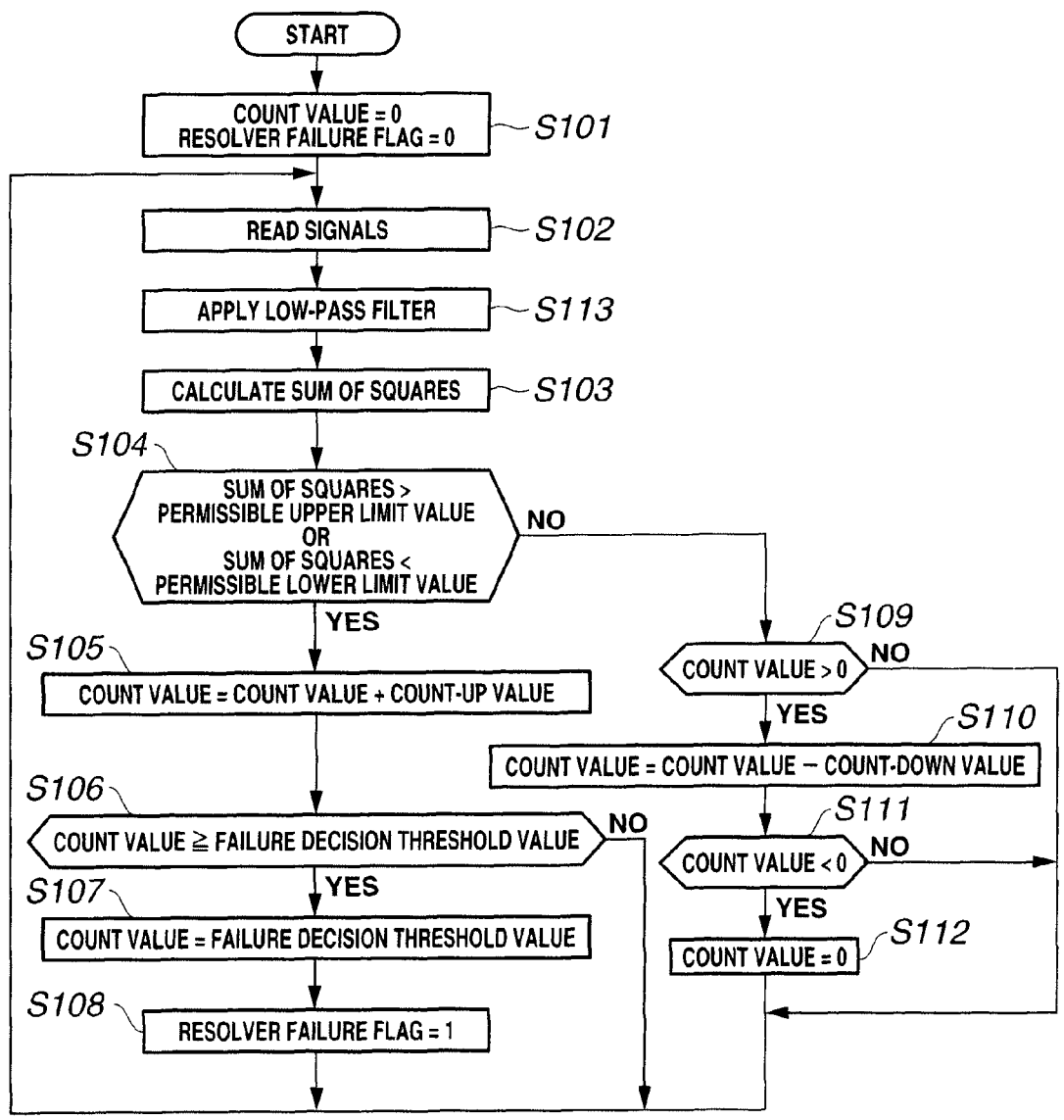
FIG. 7 is a flowchart showing processing contents in the resolver failure detecting section shown in FIG. 6.

FIGS. 6 and 7 are views showing a first modified example of the above-explained first embodiment. FIG. 6 is a block diagram showing details of a resolver failure detecting section (or means) 41. FIG. 7 is a flowchart showing processing contents in the resolver failure detecting section 41.

In this modified example, as shown in FIG. 6, the resolver failure detecting section 41 includes a low-pass filter processing section (or means) 42 functioning to apply a low-pass filter process to the sine signal and the cosine signal. That is, the square-sum calculating section 37 calculates the sum value of squares on the basis of the sine and cosine signals passed through the low-pass filter. Because the other parts of this modified example are similar as the above-explained pre-modified example of the first embodiment, the explanations thereof will be omitted for the purpose of simplification of the disclosure.

More specifically, as shown in FIG. 7, the resolver failure detecting section 41 reads the sine signal and the cosine signal at step S102, and then smoothes the sine and cosine signals by means of the low-pass filter process at step S113 so that noises included in the sine and cosine signals are eliminated. Then, at step S103, the sum value of squares is calculated based on the sine signal and cosine signal given through the low-pass filter. This low-pass filter process is attained, for example, by using a moving-average method or a difference formula obtained by applying z-transform to a transfer function $G(s)=1/(1+\tau S)$.

Therefore, in this modified example, the failure detection apparatus further includes the low-pass filter processing section 42 configured to apply the low-pass filter process to at least one of the sine signal and the cosine signal; and the inspection value calculating section 37 is configured to calculate the inspection value based on the at least one of the sine signal and cosine signal passed through the low-pass filter by the low-pass filter processing section 42. Accordingly, the effects similar as the above-mentioned pre-modified example of the first embodiment can be obtained, and in addition, the actual failure (abnormal state) of the resolver can be detected more accurately by reducing the influence of noises included in the sine and cosine signals.

FIGS. 8A to 8C are timing charts showing one example of operations of the resolver failure detecting section 36 when the resolver 17 becomes in the failure state, in a second modified example of the first embodiment. FIG. 8A is a timing chart showing one example of variations of the sum value of squares. FIG. 8B is a timing chart showing a variation of the count value in the case where the sum value of squares varies as shown in FIG. 8A. FIG. 8C is a timing chart showing a variation of the resolver failure flag f_err in the case that the count value varies as shown in FIG. 8B. FIG. 9 is a flowchart showing concrete processing contents of the resolver failure detecting section 36 in the modified example shown in FIGS. 8A to 8C.

In this modified example, in order to earlier detect the failure of resolver 17, a degree of increment (amount) by which the count value is gradually increased is varied according to the difference between the sum value of squares and the above-mentioned reference value (=1). In the same manner, a degree of decrement (amount) by which the count value is gradually decreased is varied according to the difference between the sum value of squares and the reference value (=1). That is, as shown in FIGS. 8A to 8C, in the case where the sum value of squares deviates from the normal range, the degree of increment for being used to gradually increase the count value is varied according to a deviation degree (amount) by which the sum value of squares deviates from the normal range. On the other hand, in the case where the sum value of squares is within the normal range, the degree of decrement for being used to decrease the count value is varied according to the difference between the sum value of squares and the reference value (=1).

More concretely, as shown in FIG. 9, at first, the resolver failure detecting section 36 carries out the initial setting at step S101 in the same manner as the above pre-modified example of the first embodiment. Then, the resolver failure detecting section 36 reads the sine signal and the cosine signal at step S102, and calculates the sum value of squares at step S103. Then, the resolver failure detecting section 36 judges whether or not the sum value of squares is lower than or equal to a second permissible upper limit value (Sum of squares≦Second permissible upper limit), and also judges whether or not the sum value of squares is greater than or equal to a second permissible lower limit value (Sum of squares≧Second permissible lower limit). Thereby, the resolver failure detecting section 36 judges whether or not both of these two conditions (relational formulas) are satisfied, at step S114.

If at least one of these both conditions (relational formulas: Sum of squares≦Second permissible upper limit, and Sum of squares≧Second permissible lower limit) is not satisfied at step S114, a second count-up value is added to the count value at step S115.

On the other hand, if the both conditions are satisfied at step S114, the resolver failure detecting section 36 judges whether or not the sum value of squares is greater than a first permissible upper limit value (Sum of squares>First permissible upper limit), and also judges whether or not the sum value of squares is lower than a first permissible lower limit value (Sum of squares<First permissible lower limit). Thereby, the resolver failure detecting section 36 judges whether or not at least one of these two conditions (Sum of squares>First permissible upper limit, and Sum of squares<First permissible lower limit) is satisfied at step S116. If at least one of these two conditions is satisfied, a first count-up value is added to the count value at step S117.

The second permissible lower limit value is set at a value smaller than the first permissible lower limit value, and the second permissible upper limit value is set at a value greater than the first permissible upper limit value (see FIG. 8A). The second count-up value is set at a value greater than the first count-up value. That is, if at least one of the both conditions of step S114 is not satisfied, it is determined that the deviation degree (amount) by which the sum value of squares deviates from the normal range is relatively large. Then, the degree of every gradual increase for the count value is made relatively great by adding the second count-up value to the count value. On the other hand, if at least one of the two conditions of step S116 is satisfied at step S116, it is determined that the deviation degree (amount) by which the sum value of squares deviates from the normal range is relatively small. Then, the degree of every gradual increase for the count value is made relatively small by adding the first count-up value to the count value.

Moreover, in this modified example, an upper-side permissible difference (upper-side tolerance) given between the reference value and the first permissible upper limit value is preset to be different from a lower-side permissible difference (lower-side tolerance) given between the reference value and the first permissible lower limit value, as shown in FIG. 8A. That is, a variation magnitude (width) of the sum value of squares in the case that at least one of (absolute) values of sin θ and cos θ becomes greater than a normal (proper) range of sin θ or cos θ, becomes greater than the variation magnitude (width) of the sum value of squares in the case that at least one of values of sin θ and cos θ becomes smaller than the normal range of sin θ or cos θ. Thus, because the upper-side permissible difference is set at a value greater than the lower-side permissible difference in this modified example, the actual failure of resolver 17 is determined more accurately.

At steps S106 to S108, the resolver failure detecting section 36 judges whether or not the failure of resolver 7 should be decided (finally determined), on the basis of the comparison between the count value and the failure decision threshold value in the same manner as the above-explained pre-modified example of the first embodiment. Then, the program returns to step S102.

On the other hand, if neither of the both conditions of step S116 is satisfied at step S116, the resolver failure detecting section 36 judges whether or not the count value is greater than 0 at step S118. If this condition (Count value>0) is satisfied at step S118, the resolver failure detecting section 36 judges whether or not the sum value of squares is greater than an upper-side threshold value (Sum of squares>Upper-side threshold value), and also judges whether or not the sum value of squares is smaller than a lower-side threshold value (Sum of squares<Lower-side threshold value), at step S119. Thereby, the resolver failure detecting section 36 judges whether or not at least one of these two conditions (relational formulas) is satisfied, at step S119. If the condition (Count value>0) of step S118 is not satisfied, the program returns to step S102.

If at least one of the two conditions of step S119 is satisfied at step S119, a second count-down value is subtracted from the count value at step S120. On the other hand, if neither of the two conditions of step S119 is satisfied at step S119, a first count-down value is subtracted from the count value at step S121.

The second count-down value is preset at a value greater than the first count-down value. That is, if at least one of the two conditions of step S119 is satisfied, it is determined that the difference between the sum value of squares and the reference value is relatively large although the sum value of squares is within the normal range. Hence, the degree of decrement by which the count value is gradually decreased (i.e., the degree of every gradual decrease for the count value) is made relatively small. On the other hand, if neither of the two conditions of step S119 is satisfied, it is determined that the difference between the sum value of squares and the reference value is relatively small under the state where the sum value of squares is within the normal range. Hence, the degree of decrement by which the count value is gradually decreased (i.e., the degree of every gradual decrease for the count value) is made relatively large.

An imaginary line (dotted line) of FIG. 8B is a timing chart of the count value in the case of the above-mentioned pre-modified example of the first embodiment. In this second modified example, the failure of resolver 17 can be detected (i.e., finally determined) earlier as compared with the pre-modified example of the first embodiment, as shown in FIG. 8B.

Therefore, according to this second modified example; the effects similar as the above-mentioned pre-modified example of the first embodiment can be obtained, and in addition, the actual failure (abnormal state) of the resolver can be detected more promptly because the degree of gradual increase of the count value and the degree of gradual decrease of the count value are varied in dependence upon the difference between the reference value and the sum of squares.

Moreover, according to the second modified example; as the range of inspection value under the normal state of resolver, the both permissible values (maximum and minimum allowable values) are set such that the difference between the reference value and the permissible upper limit value is different from the difference between the reference value and the permissible lower limit value. Specifically, the difference between the reference value and the permissible upper limit value is set to be greater than the difference between the reference value and the permissible lower limit value. Therefore, the failure of the resolver can be detected more accurately.

Figure 10:
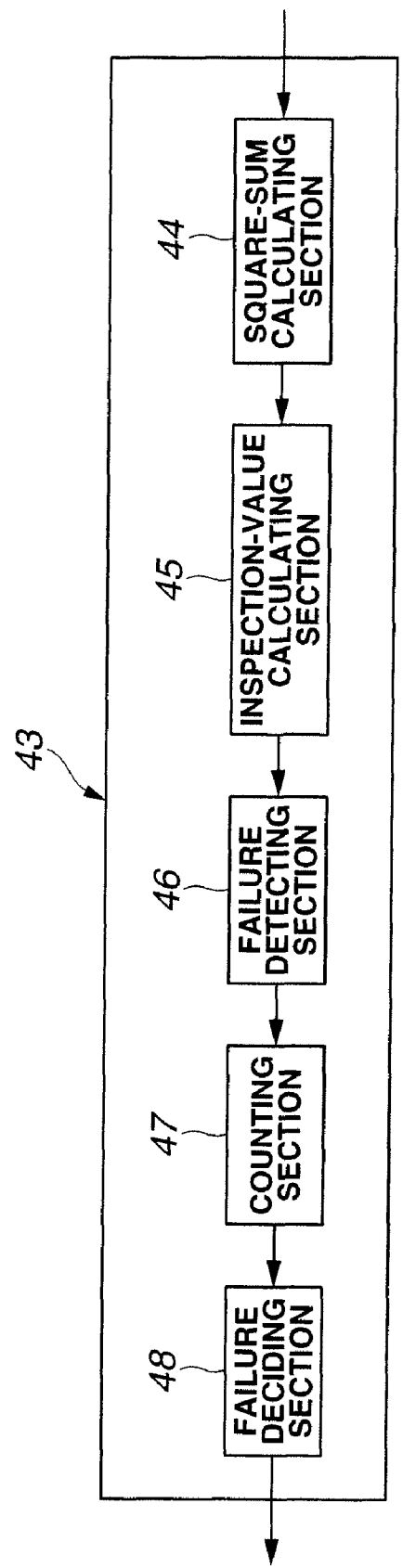
FIG. 10 is a block diagram showing a resolver failure detecting section in a second embodiment according to the present invention.

FIG. 10 and FIGS. 11A to 11C are views showing a second embodiment according to the present invention. FIG. 10 is a block diagram showing a resolver failure detecting section (or means) 43. FIGS. 11A to 11C are timing charts showing one example of operations of the resolver failure detecting section 43 when the resolver 17 causes a failure. FIG. 11A is a timing chart showing one example of variations of the sum value of squares, variations of an after-mentioned upper-side inspection value, and variations of an after-mentioned lower-side inspection value. FIG. 11B is a timing chart showing a variation of the count value in the case that the sum value of squares varies as shown in FIG. 11A. FIG. 11C is a timing chart showing a variation of the resolver failure flag f_err in the case that the count value varies as shown in FIG. 11B.

In this second embodiment, the resolver failure detecting section 43 includes a square-sum calculating section 44 functioning as first inspection-value calculating means, an inspection-value calculating section 45 functioning as second inspection-value calculating means, a failure detecting section 46 functioning as failure detecting means, a counting section 47 functioning as counting means, and a failure deciding section 48 functioning as failure finally-determining means, as shown in FIG. 10.

The square-sum calculating section 44 calculates the sum value of squares which is the sum of a value given by squaring sin θ indicated by the sine signal and a value given by squaring cos θ indicated by the cosine signal, as a first inspection value as shown in FIG. 11A.

The inspection-value calculating section 45 calculates the upper-side inspection value as a second inspection value and the lower-side inspection value as a third inspection value, on the basis of the sum of squares, as shown in FIG. 11A.

More specifically, when the sum value of squares is greater than the (current) upper-side inspection value, the inspection-value calculating section 45 sets the upper-side inspection value at the sum value of squares. On the other hand, when the sum value of squares is lower than the (current) upper-side inspection value, the inspection-value calculating section 45 reduces the upper-side inspection value gradually with a lapse of time within a range defined by an after-mentioned lower limit value. Moreover, when the sum value of squares is smaller than the (current) lower-side inspection value, the inspection-value calculating section 45 sets the lower-side inspection value at the sum value of squares. On the other hand, when the sum value of squares is greater than the (current) lower-side inspection value, the inspection-value calculating section 45 increases the lower-side inspection value gradually with a lapse of time within a range defined by an after-mentioned upper limit value.

The failure detecting section 46 judges the presence or absence of failure of resolver 17 on the basis of the upper-side and lower-side inspection values. More specifically, the failure detecting section 46 determines that the resolver 17 is in the failure state (improper state) when at least one of the both inspection values deviates from a normal range given between a predetermined permissible upper limit value and a predetermined permissible lower limit value.

The counting section 47 gradually increases the count value with a lapse of time, when the failure detecting section 46 is determining that the resolver 17 is in the failure state, as shown in FIG. 11B.

If the count value has become greater than or equal to a predetermined resolver-failure judging threshold value; the failure deciding section 48 decides (i.e., finally determines) that the resolver 17 has caused a failure (improper state), and then sets the resolver failure flag f_err at 1, as shown in FIG. 11C.

Figure 12:
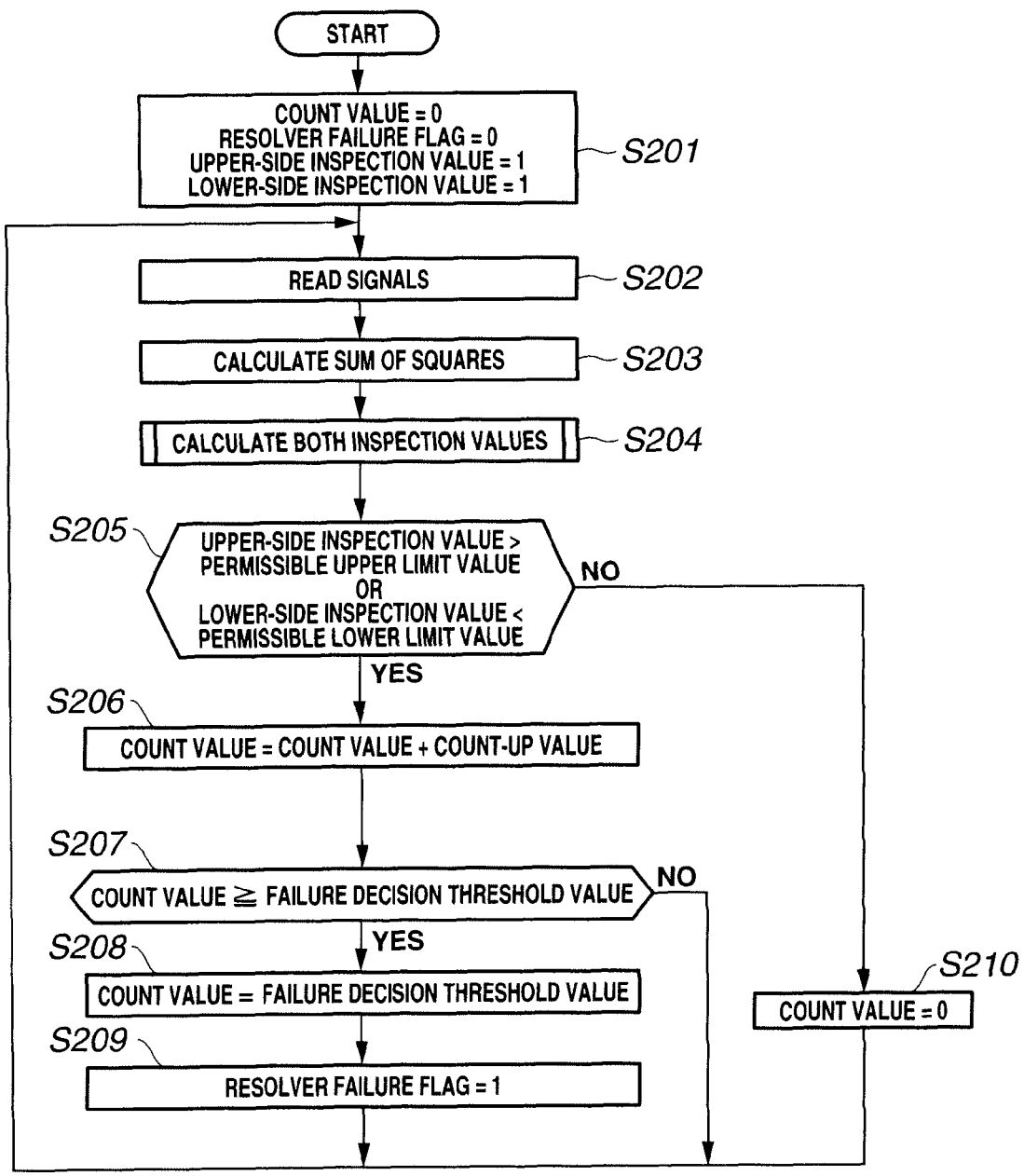
FIG. 12 is a flowchart showing processing contents in the resolver failure detecting section in the second embodiment.
Figure 13:
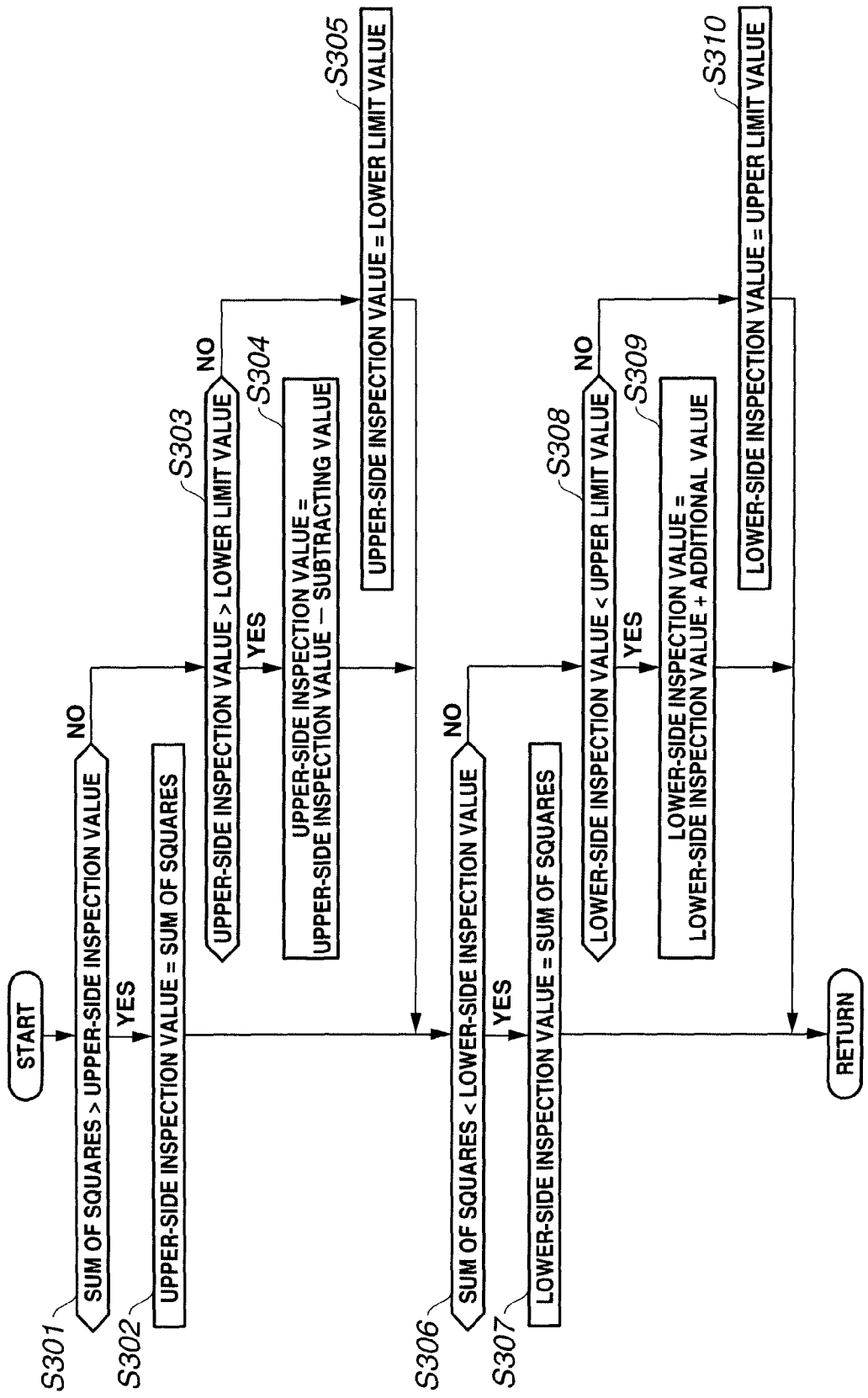
FIG. 13 is a flowchart showing a subroutine which is called by step S204 of FIG. 12.

FIG. 12 is a flowchart showing processing contents in the resolver failure detecting section 43 shown in FIG. 10. FIG. 13 is a flowchart showing a subroutine which is called by step S204 of FIG. 12 as mentioned below.

More specifically, as shown in FIG. 12, the resolver failure detecting section 43 sets the count value at 0, sets the resolver failure flag f_err at 0, and further sets the upper-side inspection value and the lower-side inspection value at their initial values, as an initial setting at step S201. In this second embodiment, each of the initial values of the both upper-side and lower-side inspection values is preset at a value identical with the reference value of the sum value of squares under the normal state of the resolver 17, i.e., is preset at 1, as shown in FIG. 11A.

Then, the resolver failure detecting section 43 reads the sine signal and the cosine signal at step S202, and calculates the sum value of squares at step S203. Then at step S204, the subroutine shown in FIG. 13 is called so that the upper-side inspection value and lower-side inspection value are calculated.

In the subroutine shown in FIG. 13, at first, it is judged whether or not the sum value of squares is greater than the upper-side inspection value (Sum of squares>Upper-side inspection value) at step S301. If this condition of step S301 is satisfied, the sum value of squares is assigned to (substituted for) the upper-side inspection value at step S302. Then, the program proceeds to step S306.

On the other hand, if the condition of step S301 is not satisfied, it is judged whether or not the upper-side inspection value is greater than the lower limit value (Upper-side inspection value>Lower limit value) at step S303. If this condition of step S303 is satisfied, a subtracting value is subtracted from the upper-side inspection value at step S304. Then, the program proceeds to step S306. If the condition of step S303 is not satisfied, the lower limit value is assigned to the upper-side inspection value at step S305. Then, the program proceeds to step S306. In this embodiment, the lower limit value is preset at 1.

At step S306, it is judged whether or not the sum value of squares is lower than the lower-side inspection value (Sum of squares>Lower-side inspection value). If this condition of step S306 is satisfied, the sum value of squares is assigned to (substituted for) the lower-side inspection value at step S307. Then, the program returns to the routine shown in FIG. 12.

On the other hand, if the condition of step S306 is not satisfied, it is judged whether or not the lower-side inspection value is lower than the upper limit value (Lower-side inspection value<Upper limit value) at step S308. If this condition of step S308 is satisfied, an additional value is added to the lower-side inspection value at step S309. Then, the program returns to the routine shown in FIG. 12. If the condition of step S308 is not satisfied, the upper limit value is assigned to the lower-side inspection value at step S310. Then, the program returns to the routine shown in FIG. 12. In this embodiment, the upper limit value is preset at 1.

Then, the resolver failure detecting section 43 judges whether or not the upper-side inspection value is greater than the permissible upper limit value (Upper-side inspection value>Permissible upper limit), and also judges whether or not the lower-side inspection value is lower than the permissible lower limit value (Lower-side inspection value<Permissible lower limit) at step S205 of FIG. 12. Thereby, the resolver failure detecting section 43 judges whether or not at least one of these two conditions is satisfied, at step S205. If at least one of the two conditions of step S205 is satisfied, the count-up value is added to the count value at step S206. Then, the program proceeds to step S207. If neither of the two conditions of step S205 is satisfied, 0 is assigned to the count value at step S210. Then, the program returns to step S202.

At step S207, it is judged whether or not the count value is greater than or equal to the failure decision threshold value (Count value≧Failure decision threshold value). If the condition of step S207 is satisfied; the failure decision threshold value is assigned to the count value at step S208, and the resolver failure flag f_err is set at 1 at step S209. Then, the program returns to step S202. If the condition of step S207 is not satisfied, the program returns to step S202.

That is, in this second embodiment, the failure detection apparatus includes a first inspection value calculating section 44 configured to calculate the first inspection value based on at least one of the sine signal and the cosine signal; a second inspection value calculating section 45 configured to calculate the second inspection value and the third inspection value on the basis of the first inspection value, configured to assign the first inspection value to the second inspection value if the first inspection value is greater than the second inspection value, configured to decrease the second inspection value gradually with a lapse of time if the first inspection value is smaller than the second inspection value, configured to assign the first inspection value to the third inspection value if the first inspection value is smaller than the third inspection value, and configured to increase the third inspection value gradually with a lapse of time if the first inspection value is greater than the third inspection value; and the failure detecting section 46 configured to judges whether or not the resolver is in the failure state on the basis of the second and third inspection values; the counting section 47 configured to increase the count value when the failure detecting section 46 is determining that the resolver is in the failure state, and configured to decrease the count value when the failure detecting section 46 is determining that the resolver is not in the failure state; and the failure deciding section 48 configured to decide that the resolver has caused a failure, on the basis of the count value.

More specifically, in the second embodiment, the first inspection value calculating section 44 is configured to calculate the first inspection value as the sum of a value given by squaring sin θ indicated by the sine signal and a value given by squaring cos θ indicated by the cosine signal. Then, the failure deciding section 48 is configured to decide that the resolver has caused a failure if the count value is greater than or equal to the failure decision threshold value.

Therefore, even in the case where the resolver actually becomes in the failed state, and thereby the first inspection value varies repeatedly in a short time into and from the normal range through the boundary of the normal range so that the state where the first inspection value is out of the normal range does not continue so long; the second inspection value or the third inspection value continuously deviates from the normal range. Accordingly, the actual failure of the resolver can be reliably detected. On the other hand, even in the case where the first inspection value momentarily deviates from the normal range due to a noise or the like, the second inspection value is gradually decreased and the third inspection value is gradually increased when the first inspection value is within the normal range. Accordingly, the resolver actually operating in the proper state can be prevented from being regarded as the failure state, so that the failure of the resolver can be detected accurately.

Also in this second embodiment, in the same manner as the above-explained first modified example of the first embodiment which is shown in FIGS. 6 and 7, the resolver failure detecting section 43 may include a low-pass filter processing section configured to apply the low-pass filter process to at least one of the sine signal and the cosine signal. Thereby, the first inspection value calculating section 44 may calculate the first inspection value based on the at least one of the sine signal and cosine signal passed through the low-pass filter by the low-pass filter processing section. In this case, the failure of the resolver can be detected more accurately by reducing the influence of the noises included in the sine signal and/or cosine signal.

Figure 8:
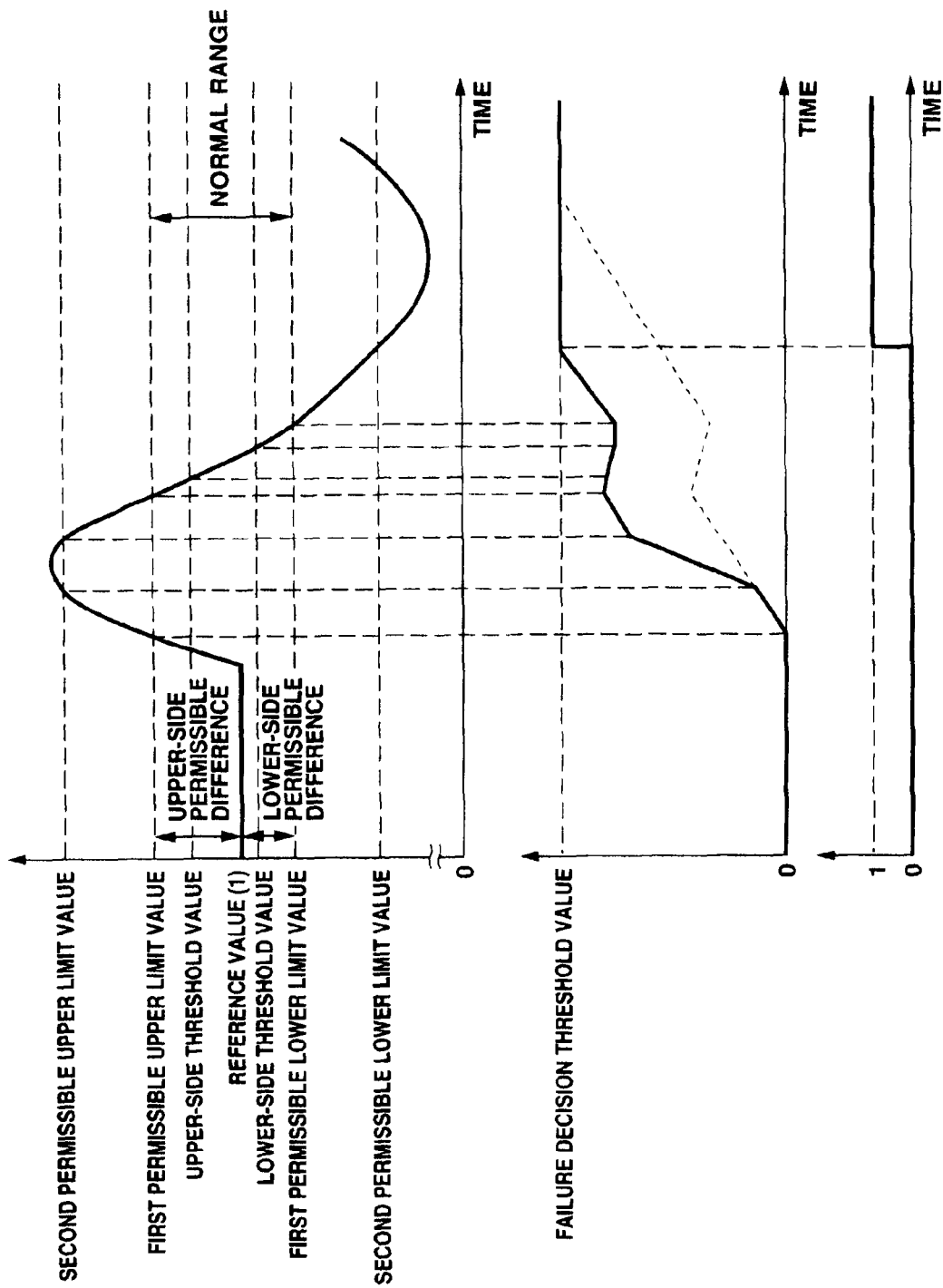
FIGS. 8A to 8C are timing charts showing one example of operations of the resolver failure detecting section, in a second modified example of the first embodiment.
Figure 9:
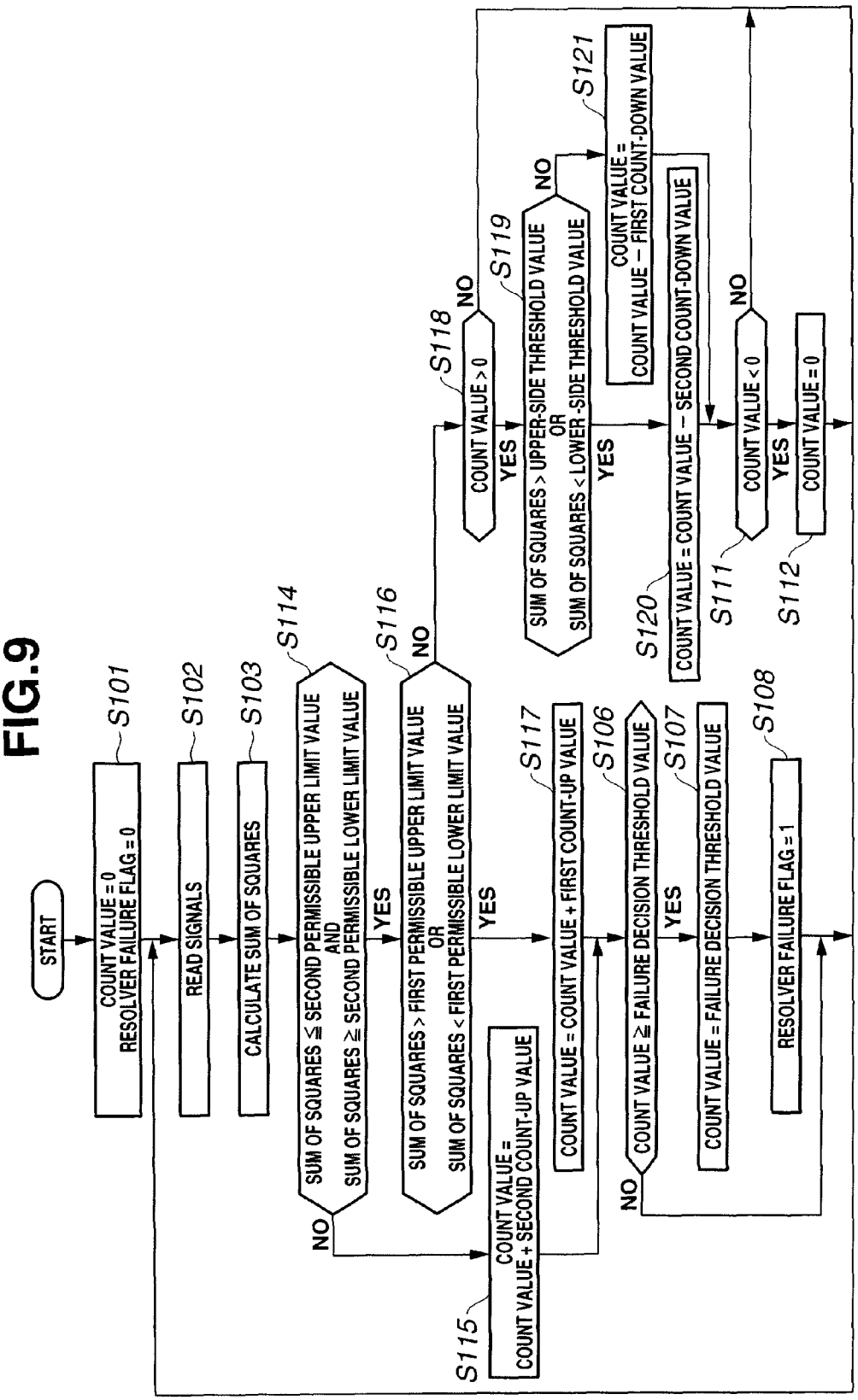
FIG. 9 is a flowchart showing processing contents of the resolver failure detecting section in the second modified example shown in FIGS. 8A to 8C.

Moreover, also in the second embodiment, in the same manner as the above-explained second modified example of the first embodiment which is shown in FIGS. 8 and 9, the permissible maximum value and the permissible minimum value (permissible upper and lower limit values) may be set such that the difference between the permissible maximum value and the reference value (an ideal value for the first inspection value when the resolver is in the normal state) is different from the difference between the permissible minimum value and the reference value. Further, the permissible maximum value and the permissible minimum value may be set such that the difference between the permissible maximum value and the reference value is greater than the difference between the permissible minimum value and the reference value. In this case, the actual failure of the resolver can be detected further accurately.

Figure 14:
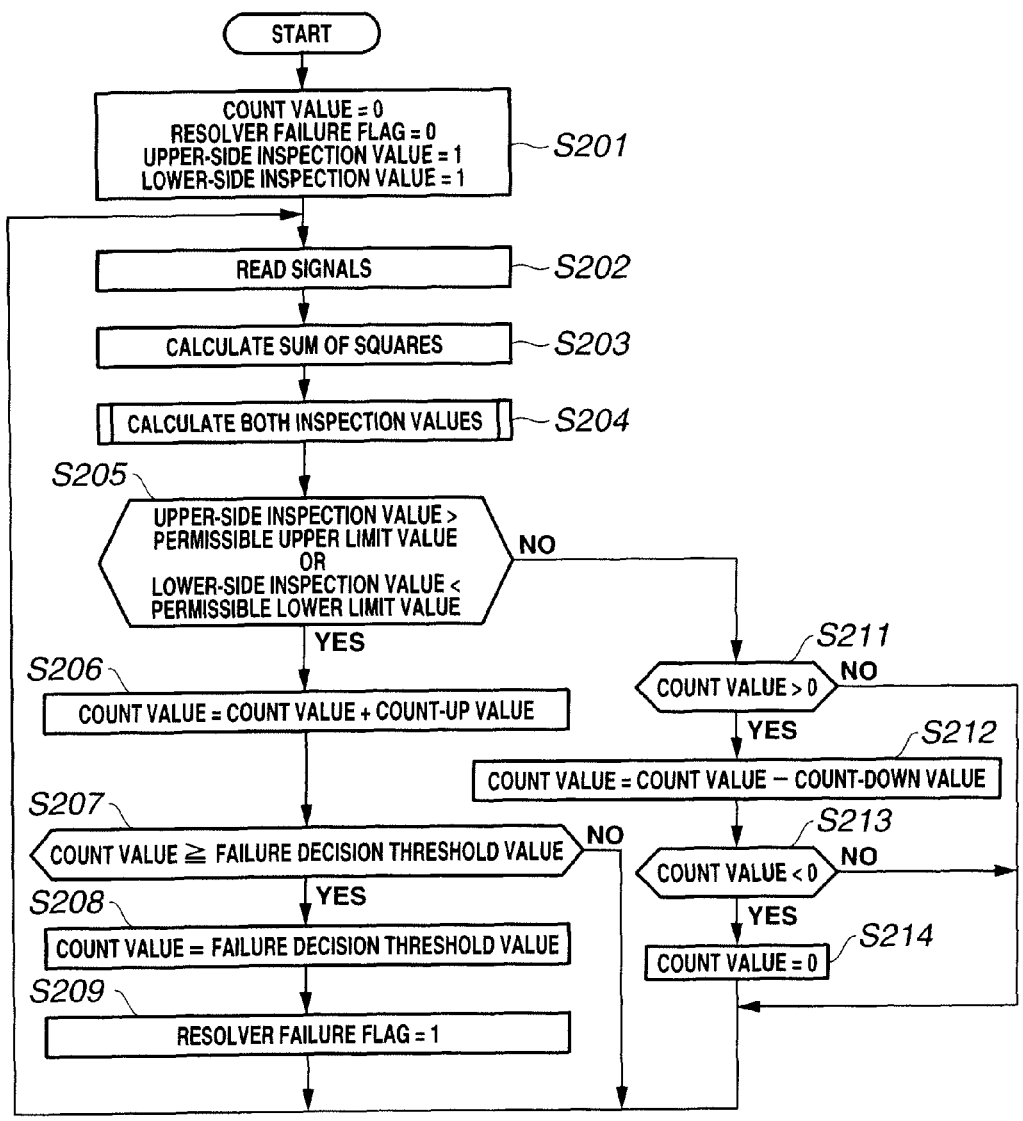
FIG. 14 is a flowchart showing processing contents of the resolver failure detecting section in a third embodiment according to the present invention.
Figures 15A, 15B, 15C:
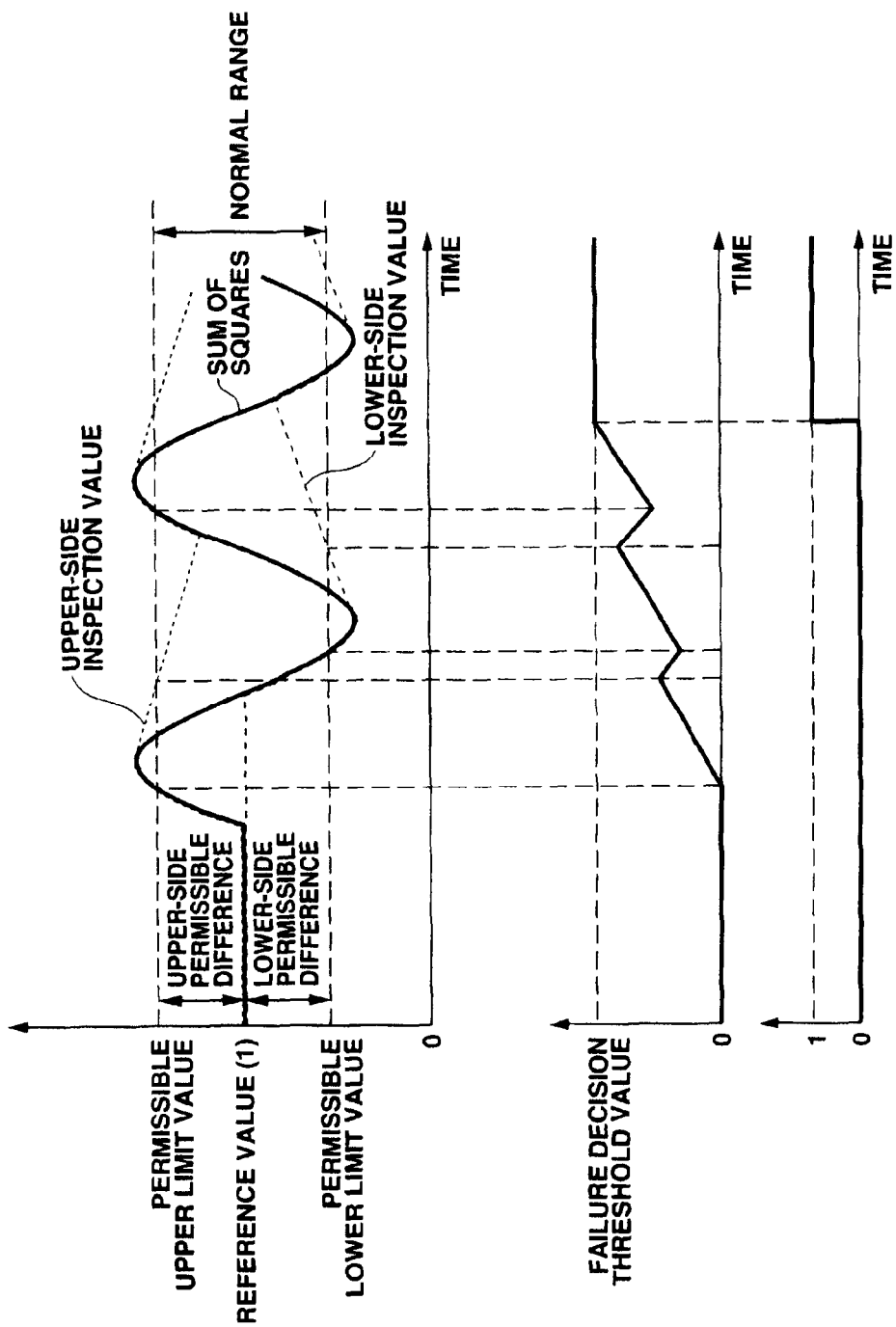
FIGS. 15A to 15C are timing charts showing one example of operations of the resolver failure detecting section 43 in the third embodiment.

FIG. 14 and FIGS. 15A to 15C are views showing a third embodiment according to the present invention. FIG. 14 is a flowchart showing processing contents of the resolver failure detecting section (or means) 43. FIGS. 15A to 15C are timing charts showing one example of operations of the resolver failure detecting section 43 in the case that the resolver 17 causes a failure. FIG. 15A is a timing chart showing one example of variations of the sum value of squares, variations of the upper-side inspection value, and variations of the lower-side inspection value. FIG. 15B is a timing chart showing a variation of the count value in the case that the sum value of squares varies as shown in FIG. 15A. FIG. 15C is a timing chart showing a variation of the resolver failure flag f_err in the case that the count value varies as shown in FIG. 15B.

The third embodiment shown in FIG. 14 and FIGS. 15A to 15C is based on the above-explained second embodiment. Additionally in this third embodiment, the count value is gradually reduced at steps S211 to S214 of FIG. 14 in the same manner as the above-explained first embodiment when both of the upper-side inspection value and the lower-side inspection value are within the above-mentioned normal range. The other parts of the third embodiment are similar as the above-explained second embodiment, the explanations thereof will be omitted for the purpose of simplification of the disclosure. Further in this third embodiment, the count-up value (amount) is set at a value (amount) greater than the count-down value (amount) in the same manner as the first embodiment, in order to quickly detect an actual failure of the resolver 17 when the resolver 17 causes the failure.

That is, in the third embodiment; the counting section (or means) adds a predetermined count-up value to the count value every a predetermined period when the failure detecting section (or means) is determining that the resolver is in the failure state, and contrary subtracts a predetermined count-down value from the count value every a predetermined period when the failure detecting section is determining that the resolver is not in the failure state. This count-up value is preset so as to be greater than the count-down value.

Therefore, according to the third embodiment, the effects similar as the above-explained second embodiment can be obtained, and in addition, the failure (abnormal state) of the resolver can be detected more promptly and accurately when the resolver becomes in the (actual) failure state.

FIG. 16 is a view showing a modified example of the third embodiment, and a flowchart showing processing contents in the resolver failure detecting section 43.

In the modified example shown in FIG. 16, the count-up value to be added to the count value takes two values different from each other between in the case that the upper-side inspection value becomes higher than the permissible upper limit value and in the case that the lower-side inspection value becomes lower than the permissible lower limit value. The other parts of this modified example are similar as the above-explained pre-modified example of the third embodiment, the explanations thereof will be omitted for the purpose of simplification of the disclosure.

More specifically, if the condition of step S215 is satisfied, namely if the upper-side inspection value is greater than the permissible upper limit value; a third count-up value is added to the count value at step S216. On the other hand, if the condition of step S217 is satisfied, namely if the lower-side inspection value is lower than the permissible lower limit value; a fourth count-up value is added to the count value at step S218. As a matter of course, the third count-up value is set at a value different from the fourth count-up value.

Therefore, according to this modified example, the effects similar as the above pre-modified example of the third embodiment can be obtained. In addition, the failure (abnormal state) of the resolver 17 can be detected furthermore accurately because the (third) count-up value which is added to the count value when the upper-side inspection value is greater than the permissible upper limit value is different from the (fourth) count-up value which is added to the count value when the lower-side inspection value is lower than the permissible lower limit value.

Figure 17:
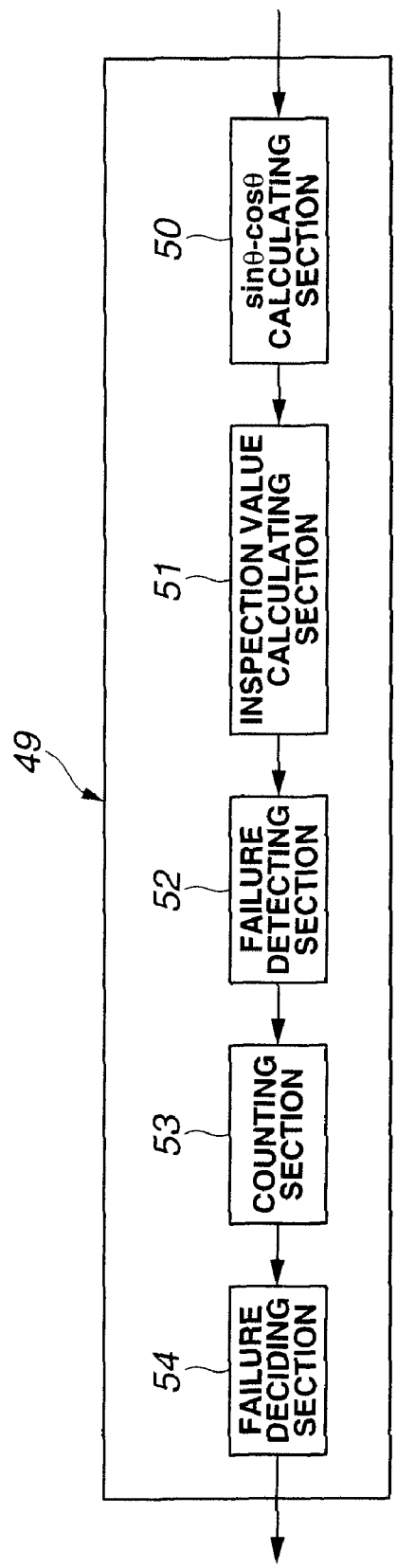
FIG. 17 is a block diagram showing details of a resolver failure detecting section in a fourth embodiment according to the present invention.
Figure 18:
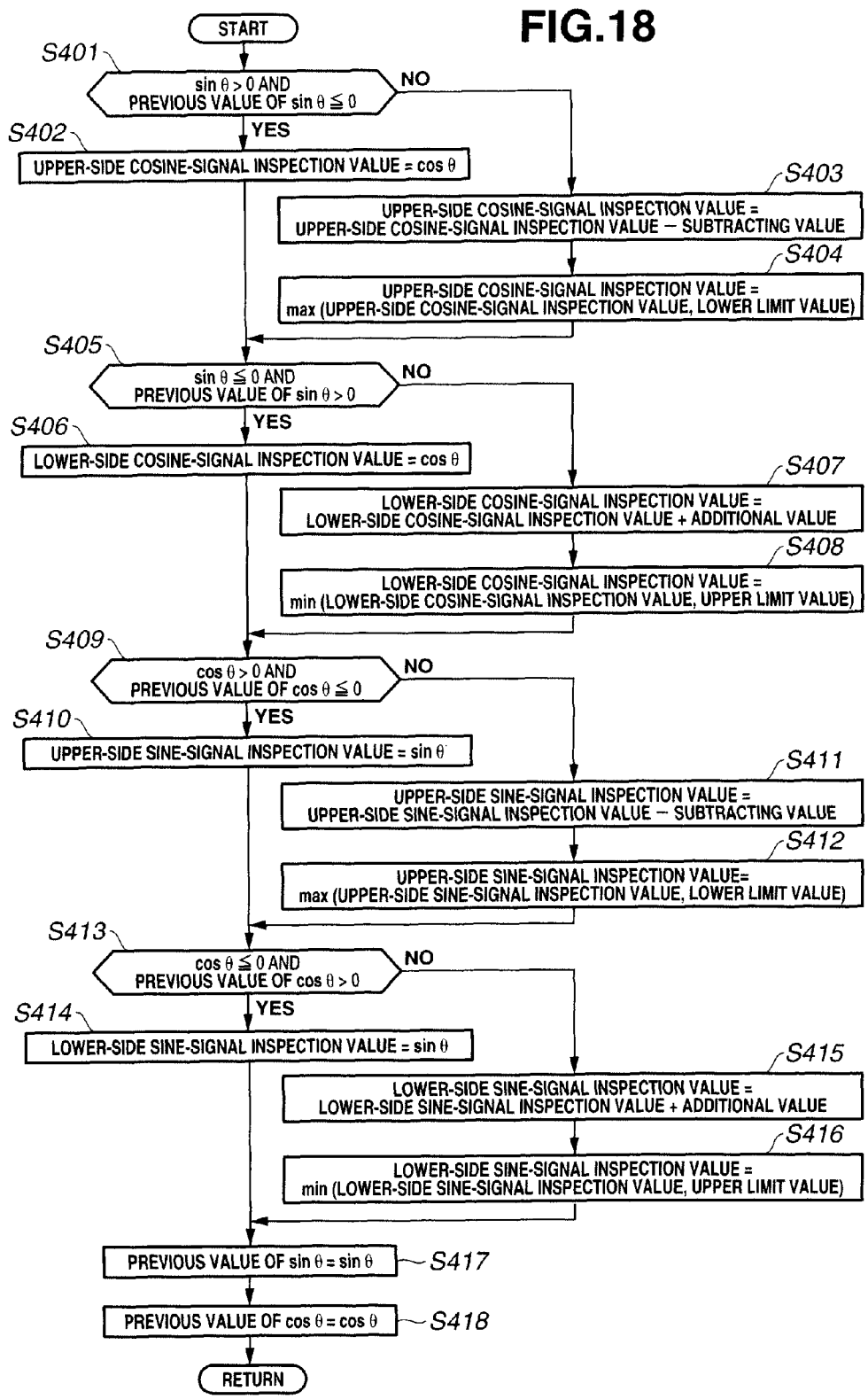
FIG. 18 is a flowchart showing processing contents in an inspection value calculating section shown in FIG. 17.

FIGS. 17 and 18 are views showing a fourth embodiment according to the present invention. FIG. 17 is a block diagram showing details of a resolver failure detecting section 49. FIG. 18 is a flowchart showing processing contents in an after-mentioned inspection value calculating section.

In the fourth embodiment, as shown in FIG. 17, the resolver failure detecting section 49 includes a sin θ-cos θ calculating section 50 as first inspection value calculating means, the inspection value calculating section 51 as second inspection value calculating means, a failure detecting section 52 as failure detecting means, a counting section 53 as counting means, and a failure deciding section 54 as failure finally-determining means.

The sin θ-cos θ calculating section 50 calculates a value of sin θ indicated by the sine signal and a value of cos θ indicated by the cosine signal, as first inspection values.

The inspection value calculating section 51 calculates an upper-side sine-signal inspection value and an upper-side cosine-signal inspection value as second inspection values, and a lower-side sine-signal inspection value and a lower-side cosine-signal inspection value as third inspection values, on the basis of the values of sin θ and cos θ.

In detail, at a timing when the (current) value of sin θ reaches a positive peak value of sin θ, the inspection value calculating section 51 assigns this value of sin θ to the upper-side sine-signal inspection value. When the value of sin θ is not the positive peak value, the upper-side sine-signal inspection value is gradually reduced within a range defined by a lower limit value. On the other hand, at a timing when the (current) value of sin θ reaches a negative peak value of sin θ, the inspection value calculating section 51 assigns this value of sin θ to the lower-side sine-signal inspection value. When the value of sin θ is not the negative peak value, the lower-side sine-signal inspection value is gradually increased within a range defined by an upper limit value.

Moreover, at a timing when the (current) value of cos θ reaches a positive peak value of cos θ, the inspection value calculating section 51 assigns this value of cos θ to the upper-side cosine-signal inspection value. When the value of cos θ is not the positive peak value, the upper-side cosine-signal inspection value is gradually reduced within a range defined by a lower limit value. On the other hand, at a timing when the (current) value of cos θ reaches a negative peak value of cos θ, the inspection value calculating section 51 assigns this value of cos θ to the lower-side cosine-signal inspection value. When the value of cos θ is not the negative peak value, the lower-side cosine-signal inspection value is gradually increased within a range defined by an upper limit value.

That is, because the positive and negative peak values of sin θ or the positive and negative peak values of cos θ are varied in response to the occurrence of a failure (improper state) of resolver 17, the presence or absence of the failure of resolver 17 is judged based on the respective inspection values calculated by the inspection value calculating section 51.

In detail, the failure detecting section 52 determines that the resolver 17 is in the failure state when at least one of the respective inspection values calculated by the inspection value calculating section 51 is deviated from a normal range defined between a predetermined permissible upper limit value and a predetermined permissible lower limit value.

The counting section 53 increases the count value gradually with a lapse of time, when the failure detecting section 52 is determining that the resolver 17 is in the failure state, in the same manner as the third embodiment. On the other hand, the counting section 53 gradually decreases the count value with a lapse of time, when the failure detecting section 52 is determining that the resolver 17 is in the normal state (not in the failure state), in the same manner as the third embodiment.

If the count value has become greater than or equal to a predetermined resolver-failure judging threshold value; the failure deciding section 54 decides (i.e., finally determines) that the resolver 17 has caused a failure (abnormal state), and then sets the resolver failure flag f_err at 1, in the same manner as the third embodiment.

More specifically, as shown in FIG. 18, at first, the inspection value calculating section 51 calculates the upper-side cosine-signal inspection value at steps S401 to S404. At step S401, it is judged whether or not the value of sin θ is greater than 0 (sin θ>0), and also it is judged whether or not a previous value (last-time-around value) of sin θ is lower than or equal to 0 (Last-time value of sin θ≦0). Thereby, the inspection value calculating section 51 judges whether or not both of these two conditions are satisfied at step S401. If the both of these conditions of step S401 are satisfied, the value of cos θ is assigned to (substituted for) the upper-side cosine-signal inspection value at step S402. That is, because the (current) value of cos θ reaches the positive peak value of cos θ at the timing when the (current) value of sin θ reaches 0 from a negative level, the (current) value of cos θ is assigned to the upper-side cosine-signal inspection value at this timing.

On the other hand, if at least one of the two conditions of step S401 is not satisfied; a subtracting value is subtracted from the upper-side cosine-signal inspection value at step S403, and then a larger one of the upper-side cosine-signal inspection value and the lower limit value (the upper-side cosine-signal inspection value or the lower limit value, whichever is larger) is assigned to the upper-side cosine-signal inspection value at step S404. That is, the upper-side cosine-signal inspection value is gradually decreased within the range larger than the lower limit value when the value of cos θ is not taking its positive pea k.

Next, at steps S405 to S408, the inspection value calculating section 51 calculates the lower-side cosine-signal inspection value. At step S405, it is judged whether or not the value of sin θ is lower than or equal to 0 (sin θ≦0), and also it is judged whether or not the previous value (last-time-around value) of sin θ is greater than 0 (Last-time value of sin θ>0). Thereby, the inspection value calculating section 51 judges whether or not both of these two conditions are satisfied at step S405. If the both of these conditions of step S405 are satisfied, the value of cos θ is assigned to the lower-side cosine-signal inspection value at step S406. That is, because the (current) value of cos θ reaches the negative peak value of cos θ at the timing when the (current) value of sin θ reaches 0 from a positive level, the (current) value of cos θ is assigned to the lower-side cosine-signal inspection value at this timing.

On the other hand, if at least one of the two conditions of step S405 is not satisfied; an additional value is added to the lower-side cosine-signal inspection value at step S407, and then a lower one of the lower-side cosine-signal inspection value and the upper limit value (the lower-side cosine-signal inspection value or the upper limit value, whichever is lower) is assigned to the lower-side cosine-signal inspection value at step S408. That is, the lower-side cosine-signal inspection value is gradually increased within the range lower than the upper limit value when the value of cos θ is not taking its negative peak value.

Next, at steps S409 to S412, the inspection value calculating section 51 calculates the upper-side sine-signal inspection value. At step S409, it is judged whether or not the value of cos θ is greater than 0 (cos θ>0), and also it is judged whether or not a previous value (last-time-around value) of cos θ is lower than or equal to 0 (Last-time value of cos θ≦0). Thereby, the inspection value calculating section 51 judges whether or not both of these two conditions are satisfied at step S409. If the both of these conditions of step S409 are satisfied, the value of sin θ is assigned to the upper-side sine-signal inspection value at step S410. That is, because the (current) value of sin θ reaches the positive peak value of sin θ at the timing when the (current) value of cos θ reaches 0 from a negative level, the (current) value of sin θ is assigned to the upper-side sine-signal inspection value at this timing.

On the other hand, if at least one of the two conditions of step S409 is not satisfied; a subtracting value is subtracted from the upper-side sine-signal inspection value at step S411, and then a larger one of the upper-side sine-signal inspection value and the lower limit value (the upper-side sine-signal inspection value or the lower limit value, whichever is larger) is assigned to the upper-side sine-signal inspection value at step S412. That is, the upper-side sine-signal inspection value is gradually decreased within the range larger than the lower limit value, when the value of sin θ is not taking its positive peak value.

Further, at steps S413 to S416, the inspection value calculating section 51 calculates the lower-side sine-signal inspection value. At step S413, it is judged whether or not the value of cos θ is lower than or equal to 0 (cos θ≦0), and also it is judged whether or not the previous value (last-time-around value) of cos θ is greater than 0 (Last-time value of cos θ>0). Thereby, the inspection value calculating section 51 judges whether or not both of these two conditions are satisfied at step S413. If the both of these conditions of step S413 are satisfied, the value of sin θ is assigned to the lower-side sine-signal inspection value at step S414. That is, because the (current) value of sin θ reaches the negative peak value of sin θ at the timing when the (current) value of cos θ reaches 0 from a positive level, the (current) value of sin θ is assigned to the lower-side sine-signal inspection value at this timing.

On the other hand, if at least one of the two conditions of step S413 is not satisfied; an additional value is added to the lower-side sine-signal inspection value at step S415, and then a lower one of the lower-side sine-signal inspection value and the upper limit value (the lower-side sine-signal inspection value or the upper limit value, whichever is lower) is assigned to the lower-side sine-signal inspection value at step S416. That is, the lower-side sine-signal inspection value is gradually increased within the range lower than the upper limit value, when the value of sin θ is not taking its negative peak value.

Then, the (current) value of sin θ is assigned to (stored as) the previous value (last-time-around value) of sin θ at step S417, and the (current) value of cos θ is assigned to (stored as) the previous value (last-time-around value) of cos θ at step S418.

Therefore, according to this embodiment, the count value is gradually increased while each of the inspection values calculated by the inspection value calculating section 51 is outside of the above-mentioned normal range (tolerance). Accordingly, even in the case that the resolver 17 has become in the failure state, and each inspection value varies outward from the normal range and soon inward into the normal range repeatedly; this failure of the resolver 7 can be reliably detected. Moreover, even in the case that each inspection value temporarily deviates from the normal range due to an influence of noise or the like and thereby the count value is increased; the count value is gradually reduced during intervals during which the each inspection value is kept within the normal range. Therefore, the resolver 17 actually in the normal state can be prevented from being determined as the failure state.

Accordingly, also in this fourth embodiment, effects similar as the third embodiment can be obtained.

Figure 19:
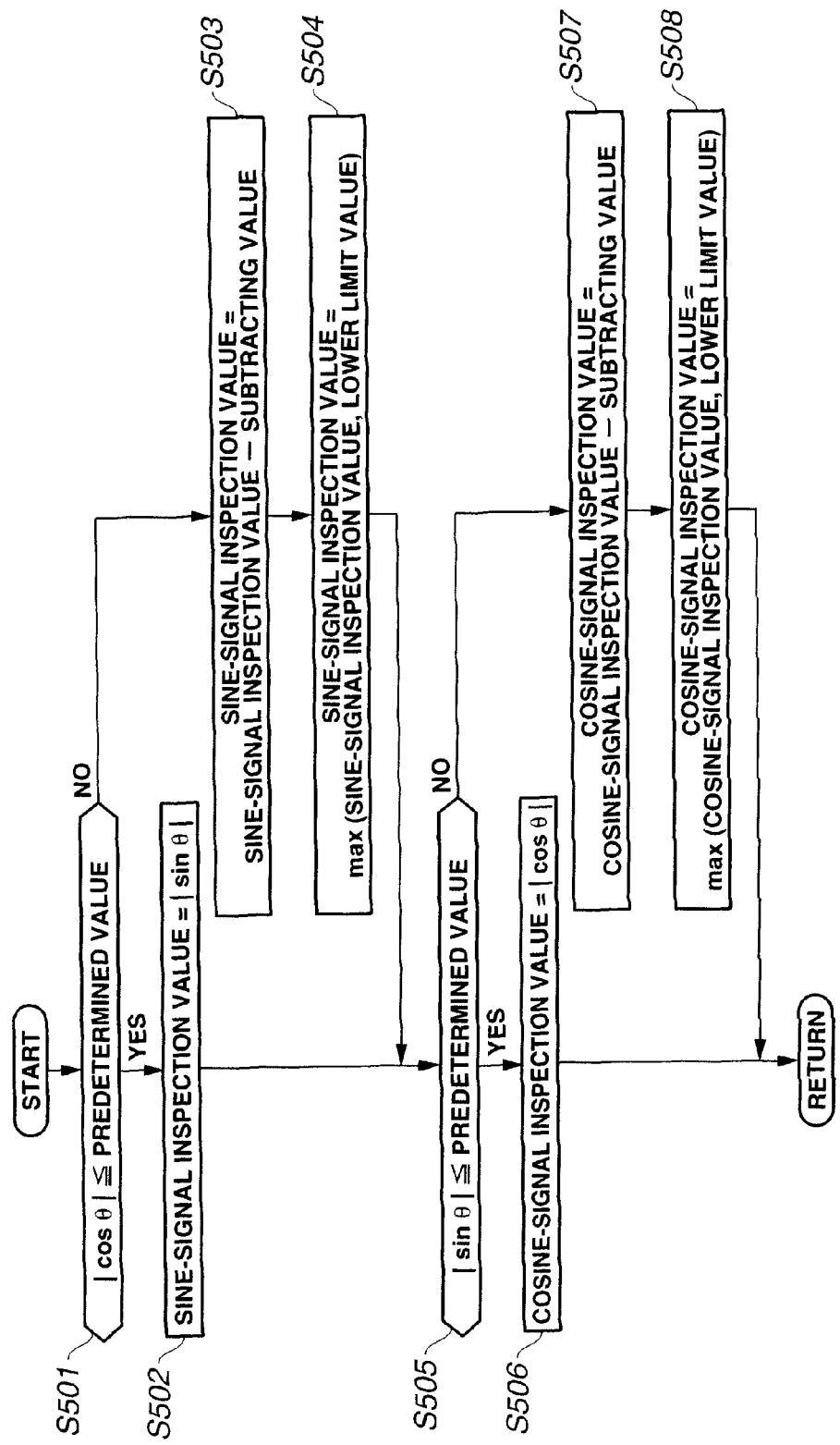
FIG. 19 is a flowchart showing processing contents of the inspection value calculating section in a modified example of the fourth embodiment.

FIG. 19 is view showing a modified example of the inspection value calculating section 51 in the fourth embodiment according to the present invention, and a flowchart showing processing contents of the inspection value calculating section 51.

In this modified example, as shown in FIG. 19, the inspection value calculating section 51 calculates a cosine-signal inspection value and a sine-signal inspection value as the second inspection values.

In detail, at first, the inspection value calculating section 51 calculates the sine-signal inspection value at steps S501 to S504. At step S501, it is judged whether or not an absolute value of cos θ is smaller than or equal to a predetermined value (|cos θ|≦Predetermined value). This predetermined value is preset at a positive value near 0. If the condition of step S501 is satisfied, an absolute value of sin θ is assigned to the sine-signal inspection value (Sine-signal inspection value←|sin θ|) at step S502. That is, because the (current) absolute value of sin θ becomes its peak value at the timing when the (current) absolute value of cos θ becomes 0, the (current) absolute value of sin θ is assigned to the sine-signal inspection value at this timing.

On the other hand, if the condition of step S501 is not satisfied; a subtracting value is subtracted from the sine-signal inspection value at step S503, and then, a greater one of the sine-signal inspection value and the lower limit value (the sine-signal inspection value or the lower limit value, whichever is greater) is assigned to the sine-signal inspection value at step S504. That is, the sine-signal inspection value is gradually decreased within the range greater than the lower limit value, when the absolute value of sin θ is not taking its peak value.

Next, the inspection value calculating section 51 calculates the cosine-signal inspection value at steps S505 to S508. At step S505, it is judged whether or not the absolute value of sin θ is smaller than or equal to the predetermined value (|sin θ|≦Predetermined value). If the condition of step S505 is satisfied, the absolute value of cos θ is assigned to the cosine-signal inspection value (Cosine-signal inspection value←|cos θ|) at step S506. That is, because the (current) absolute value of cos θ becomes its peak value at the timing when the (current) absolute value of sin θ becomes 0, the (current) absolute value of cos θ is assigned to the cosine-signal inspection value at this timing.

On the other hand, if the condition of step S505 is not satisfied; the subtracting value is subtracted from the cosine-signal inspection value at step S507, and then, a greater one of the cosine-signal inspection value and the lower limit value (the cosine-signal inspection value or the lower limit value, whichever is greater) is assigned to the cosine-signal inspection value at step S508. That is, the cosine-signal inspection value is gradually decreased within the range greater than the lower limit value, when the absolute value of cos θ is not taking its peak value.

Therefore, according to this modified example, the failure (improper state) of resolver 17 can be decided substantially in the same manner as the above pre-modified example of the fourth embodiment, and also effects similar as the pre-modified example can be achieved.

This application is based on prior Japanese Patent Application No. 2008-32660 filed on Feb. 14, 2008. The entire contents of this Japanese Patent Application are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A failure detection apparatus for a resolver, the resolver being configured to output a sine signal indicative of sin θ and a cosine signal indicative of cos θ according to a rotational angle θ of a rotator, the failure detection apparatus comprising:
    a first inspection value calculating section configured to calculate a first inspection value based on at least one of the sine signal and the cosine signal;
    a second inspection value calculating section configured
        to calculate a second inspection value and a third inspection value on the basis of the first inspection value,
        to assign the first inspection value to the second inspection value if the first inspection value is greater than the second inspection value,
        to decrease the second inspection value gradually with a lapse of time if the first inspection value is smaller than the second inspection value,
        to assign the first inspection value to the third inspection value if the first inspection value is smaller than the third inspection value, and
        to increase the third inspection value gradually with a lapse of time if the first inspection value is greater than the third inspection value; and
    a failure detecting section configured to judge whether the resolver is in a failure state or not on the basis of the second and third inspection values;
    a counting section configured to increase a count value when the failure detecting section is determining that the resolver is in the failure state, and configured to decrease the count value when the failure detecting section is determining that the resolver is not in the failure state; and
    a failure deciding section configured to decide that the resolver has caused the failure on the basis of the count value.

2. The failure detection apparatus as claimed in claim 1, wherein
    the counting section is configured to add a predetermined count-up value to the count value every a predetermined period when the failure detecting section is determining that the resolver is in the failure state, and is configured to subtract a predetermined count-down value from the count value every a predetermined period when the failure detecting section is determining that the resolver is not in the failure state; and
    the predetermined count-up value is greater than the predetermined count-down value.

3. The failure detection apparatus as claimed in claim 1, wherein
    the failure deciding section is configured to decide that the resolver has caused the failure if the count value is greater than or equal to a failure decision threshold value.

4. The failure detection apparatus as claimed in claim 1, further comprising
    a low-pass filter processing section configured to apply a low-pass filter process to at least one of the sine signal and the cosine signal; and
    wherein the first inspection value calculating section is configured to calculate the first inspection value based on the at least one of the sine signal and cosine signal passed through the low-pass filter by the low-pass filter processing section.

5. The failure detection apparatus as claimed in claim 1, wherein
    the first inspection value is a sum of a value given by squaring sin θ indicated by the sine signal and a value given by squaring cos θ indicated by the cosine signal.

6. The failure detection apparatus as claimed in claim 1, wherein
    the failure detecting section is configured to determine that the resolver is in the failure state if at least one of the second and third inspection values is outside of a normal range given between a permissible maximum value and a permissible minimum value; and
    the permissible maximum value and the permissible minimum value are set such that a difference between the permissible maximum value and a reference value is different from a difference between the permissible minimum value and the reference value, the reference value being an ideal value for the first inspection value when the resolver is in a normal state.

7. The failure detection apparatus as claimed in claim 6, wherein
    the permissible maximum value and the permissible minimum value are set such that the difference between the permissible maximum value and the reference value is greater than the difference between the permissible minimum value and the reference value.

* * * * *